United States Patent [19]
Miller

[11] 4,110,605
[45] Aug. 29, 1978

[54] WEIGHT AND BALANCE COMPUTER APPARATUS FOR AIRCRAFT

[75] Inventor: Harry Miller, Scottsdale, Ariz.

[73] Assignee: Sperry Rand Corporation, New York, N.Y.

[21] Appl. No.: 772,186

[22] Filed: Feb. 25, 1977

[51] Int. Cl.² .............................................. G06G 7/78
[52] U.S. Cl. ....................................... 364/463; 73/65; 73/178 T
[58] Field of Search .................... 73/65, 178 R, 178 T; 235/150.2, 150.22, 150.21, 92 WT, 151.33, 197; 244/181–183; 340/27

[56] References Cited
U.S. PATENT DOCUMENTS

| | | | |
|---|---|---|---|
| 3,048,329 | 8/1962 | Berggren | 235/150.22 |
| 3,159,738 | 12/1964 | James et al. | 235/150.22 X |
| 3,654,443 | 4/1972 | Dendy et al. | 235/150.2 |
| 3,691,356 | 9/1972 | Miller | 244/182 X |

*Primary Examiner*—Stephen G. Kunin
*Attorney, Agent, or Firm*—Howard P. Terry; Albert B. Cooper

[57] ABSTRACT

Aircraft weight and balance computer apparatus processes sensor outputs to generate an electrical signal that is proportional to aircraft gross weight at the time take-off thrust is initially applied to the aircraft on the runway and continually updates the weight signal when airborne to account for burn off of fuel or other weight loss and also provides a measure of the location of the aircraft center of gravity position. This is achieved by computing the aerodynamic forces on the aircraft in its longitudinal plane and the thrust generated by the engines and relating these computations to the corresponding acceleration components measured by a pair of linear accelerometers that are mounted orthogonally in this longitudinal plane.

28 Claims, 22 Drawing Figures

GROSS WEIGHT COMPUTER BLOCK DIAGRAM

AIRCRAFT FORCES ON RUNWAY

AIRCRAFT FORCES WHEN AIRBORNE

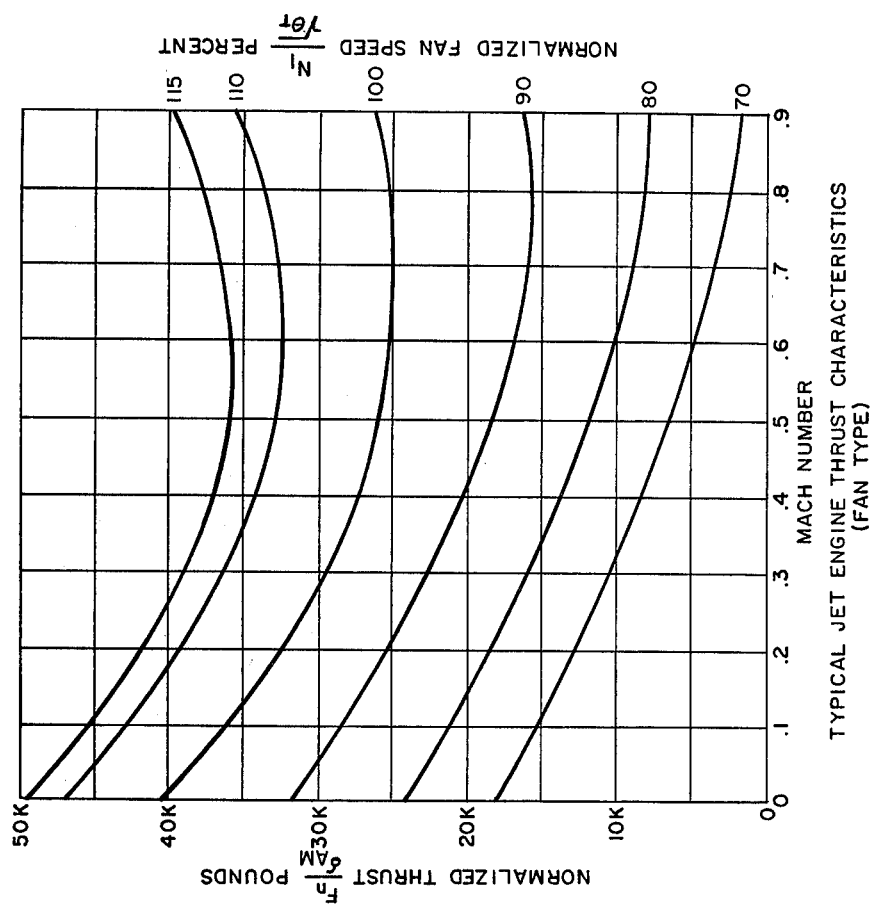
FIG. 4. TYPICAL JET ENGINE THRUST CHARACTERISTICS (FAN TYPE)
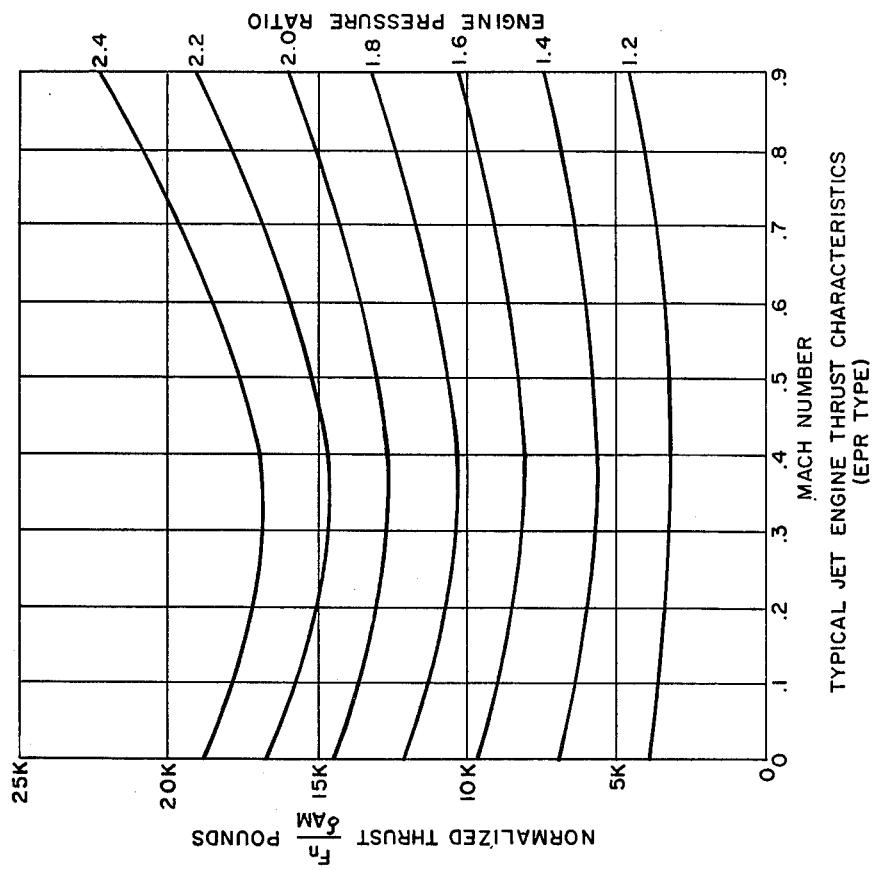
FIG. 3. TYPICAL JET ENGINE THRUST CHARACTERISTICS (EPR TYPE)

GROSS WEIGHT COMPUTER BLOCK DIAGRAM

TYPICAL ALPHA FUNCTION CHARACTERISTICS

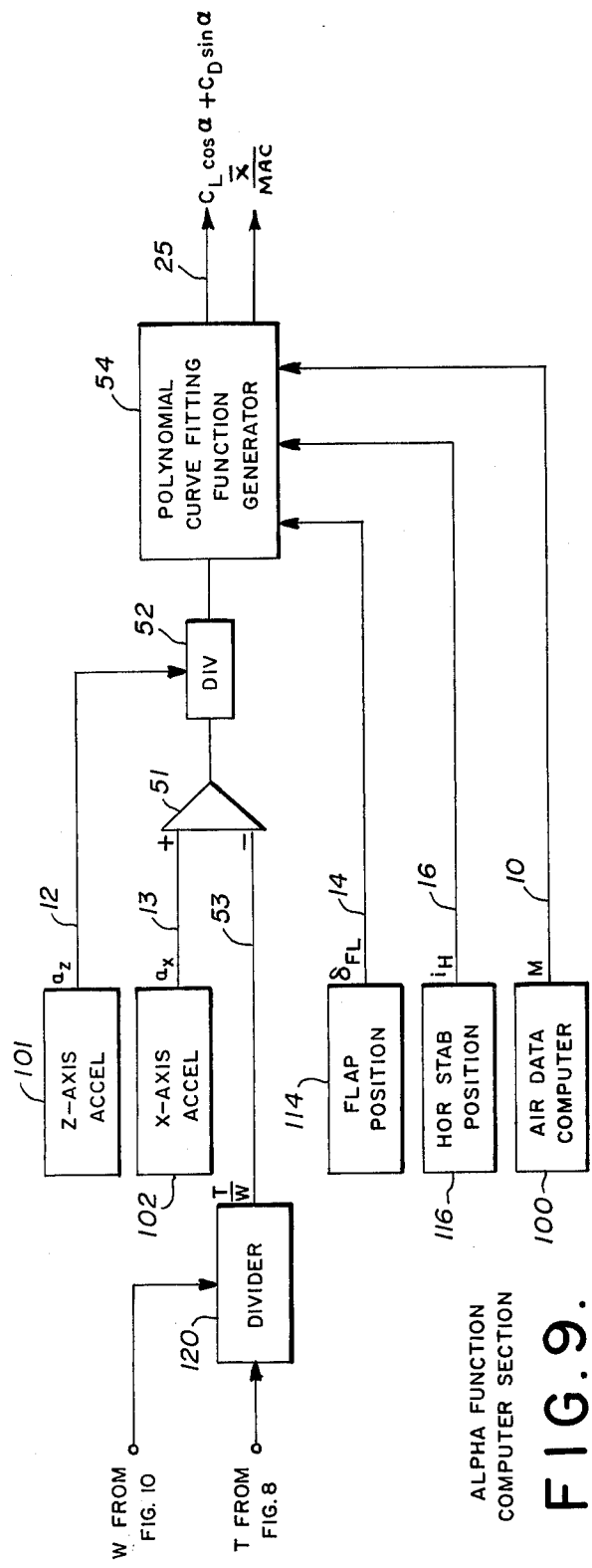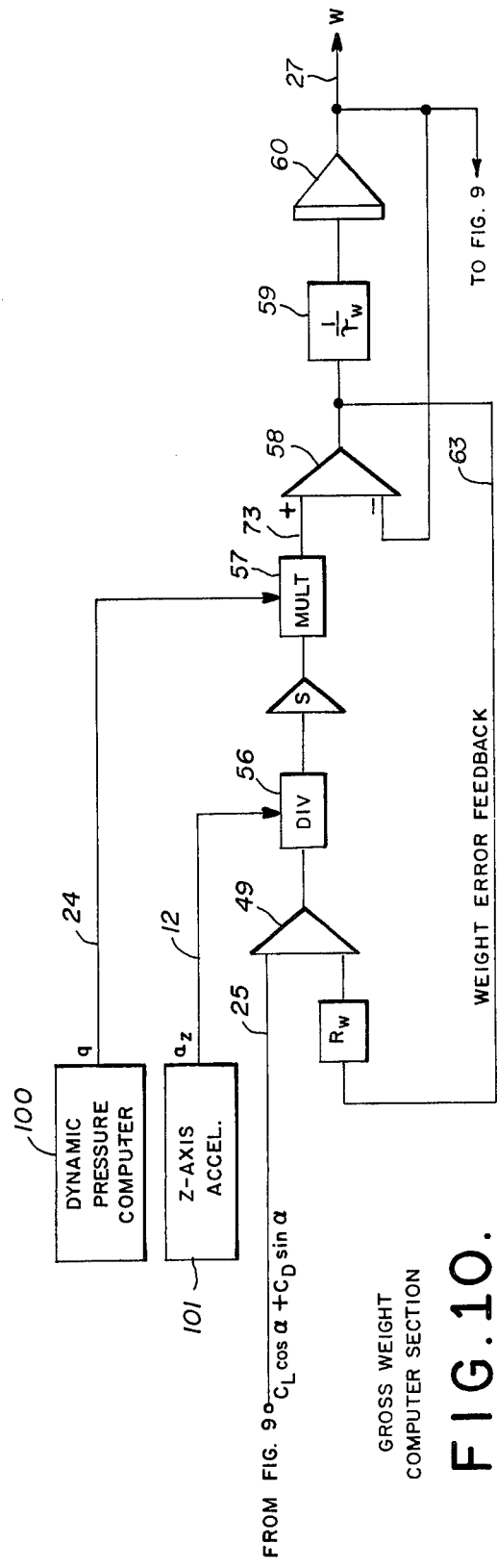
FIG. 9. ALPHA FUNCTION COMPUTER SECTION
FIG. 10. GROSS WEIGHT COMPUTER SECTION

AERODYNAMIC FORCES AND MOMENTS ON AIRCRAFT WING AND HORIZONTAL STABILIZER

LINEAR ALPHA FUNCTION CHARACTERISTICS

EFFECT OF FLAP POSITION AND MACH NUMBER ON TYPICAL
AIRCRAFT PARAMETERS REQUIRED FOR WEIGHT COMPUTATION

| FLAP POSITION | MACH NUMBER | $\frac{X_{AC}}{MAC}$ | $C_{m_o}$ | $C_{m_{i_H}}$ | $\varepsilon_o$ | $\varepsilon_\alpha$ | FWD. C.G. $C_{L_\alpha}$ | AFT. C.G. $C_{L_\alpha}$ | $C_{D_O}$ | $k_D$ | $\alpha_{OL}$ | $H_O$ |
|---|---|---|---|---|---|---|---|---|---|---|---|---|
| 50 | | .237 | −.425 | −.048 | 4.90 | .382 | .0800 | .0870 | .140 | .055 | −11.9 | 3.400 |
| 30 | | .224 | −.300 | −.048 | 3.90 | .395 | .0792 | .0862 | .073 | .055 | −9.4 | 3.337 |
| 15 | | .206 | −.163 | −.048 | 2.62 | .427 | .0786 | .0856 | .040 | .055 | −6.0 | 2.662 |
| 0 | | .195 | −.022 | −.048 | 1.30 | .457 | .0780 | .0850 | .024 | .055 | −1.7 | 1.764 |
| | .4 | .195 | −.022 | −.048 | 1.50 | .470 | .075 | .082 | .015 | .055 | −2.4 | 2.314 |
| | .6 | .195 | −.024 | −.050 | 1.50 | .500 | .077 | .083 | .015 | .055 | −2.4 | 2.220 |
| | .7 | .205 | −.027 | −.051 | 1.45 | .520 | .080 | .087 | .015 | .055 | −2.4 | 2.073 |
| | .8 | .242 | −.029 | −.054 | 1.45 | .580 | .087 | .095 | .015 | .058 | −2.4 | 1.921 |
| | .9 | .355 | −.032 | −.062 | 1.90 | .670 | .105 | .114 | .020 | .110 | −2.4 | 2.176 |

FIG.13.

TABLE OF TYPICAL ALPHA FUNCTIONS $\delta_{FL} = 0$ ; $M = 0.4$ ; $\frac{\bar{x}}{MAC} = 0.10$ ; $C_L = .075(\alpha + 2.4)$ ; $C_D = .055\ C_L^2$

| ANGLE OF ATTACK $\alpha$ | $C_L$ | $C_D$ | $C_L \sin\alpha - C_D \cos\alpha$ | $C_L \cos\alpha + C_D \sin\alpha$ | $\dfrac{C_L \sin\alpha - C_D \cos\alpha}{C_L \cos\alpha + C_D \sin\alpha}$ | TRIM HOR STAB POSITION $i_H$ |
|---|---|---|---|---|---|---|
| 0  | .1800  | .0168 | -.0168 | .1800  | -.0933 | 0.676  |
| 2  | .3300  | .0210 | -.0095 | .3305  | -.0287 | -0.704 |
| 4  | .4800  | .0277 | .0059  | .4808  | .0123  | -2.085 |
| 6  | .6300  | .0368 | .0292  | .6304  | .0463  | -3.464 |
| 8  | .7800  | .0485 | .0605  | .7792  | .0776  | -4.842 |
| 10 | .9300  | .0626 | .0998  | .9267  | .1077  | -6.217 |
| 12 | 1.0800 | .0792 | .1471  | 1.0728 | .1371  | -7.589 |
| 14 | 1.2300 | .0982 | .2023  | 1.2172 | .1662  | -8.958 |

$i_H = \left\{ \left\{ (.095)(C_L \cos\alpha + C_D \sin\alpha) + .022 \right\} \left( -\dfrac{1}{.048} \right) + 1.50 - .54\alpha \right\}$

FIG. 14.

TABLE OF TYPICAL ALPHA FUNCTIONS $\delta_{FL} = 0$; $M = 0.4$; $\frac{\overline{X}}{MAC} = 0.305$; $C_L = .082(\alpha + 2.4)$; $C_D = .015 + .055\,C_L^2$

| ANGLE OF ATTACK $\alpha$ | $C_L$ | $C_D$ | $C_L \sin\alpha - C_L \cos\alpha$ | $C_L \cos\alpha + C_D \sin\alpha$ | $\dfrac{C_L \sin\alpha - C_D \cos\alpha}{C_L \cos\alpha + C_D \sin\alpha}$ | TRIM HOR STAB POSITION $i_H$ |
|---|---|---|---|---|---|---|
| 0  | .1968  | .0171 | -.0171 | .1968  | -.0869 | 1.493 |
| 2  | .3608  | .0222 | -.0095 | .3614  | -.0266 | 0.794 |
| 4  | .5412  | .0311 | .0068  | .5421  | .0125  | 0.132 |
| 6  | .6888  | .0411 | .0311  | .6893  | .0451  | -0.607 |
| 8  | .8528  | .0550 | .0642  | .8522  | .0753  | -1.310 |
| 10 | 1.0168 | .0719 | .1057  | 1.0138 | .1043  | -2.015 |
| 12 | 1.1808 | .0917 | .1558  | 1.1740 | .1327  | -2.724 |
| 14 | 1.3448 | .1145 | .2142  | 1.3326 | .1607  | -3.437 |

$i_H = \left\{ (-.11)(C_L \cos\alpha + C_D \sin\alpha) + .022 \right\} \left( \dfrac{1}{-.048} \right) + 1.50 - .54\alpha$

FIG. 15.

TYPICAL ALPHA FUNCTION COEFFICIENTS FOR VARIOUS FLAP POSITIONS

| Flap Position | a | b | c | d | e | f | g | h |
|---|---|---|---|---|---|---|---|---|
| 50 | .1668 | .6380 | -7.7924 | -19.1153 | -7.2619 | -28.8121 | 1.9458 | 5.2582 |
| 30 | .1292 | .6598 | -5.8790 | -20.4295 | -4.3617 | -29.0446 | 1.4666 | 5.5330 |
| 15 | .0844 | .6476 | -4.0730 | -20.0850 | -1.9378 | -24.7535 | .9961 | 5.3616 |
| 0 | .0361 | .5330 | -2.2115 | -15.2769 | -.3710 | -16.8811 | .5231 | 4.1361 |

$$k = g + hj + \left(\frac{a-bj}{c-dj}\right)(e+fj-i_H)$$

$$\frac{\bar{x}}{MAC} = \frac{\bar{x}_{AFT}}{MAC} + \left\{\frac{\bar{x}_{AFT} - \bar{x}_{FWD}}{MAC}\right\} \left\{\frac{e+fj-i_H}{c+dj}\right\}$$

$$k = C_L \cos\alpha + C_D \sin\alpha$$

$$J = \frac{C_L \sin\alpha - C_D \cos\alpha}{C_L \cos\alpha + C_D \sin\alpha} = \left(\frac{a_x}{g} - \frac{T}{W}\right)\left(\frac{g}{a_z}\right)$$

FIG. 18.

NOTE 1. THE INTERMEDIATE VARIABLES ARE CALCULATED FOR EACH ENGINE

NOTE 2. TOTAL THRUST T IS THE SUM OF THE THRUSTS OF ALL ENGINES
WHERE SYMBOL $*$ = MULTIPLY

THRUST COMPUTATION PROGRAM

WEIGHT COMPUTATION PROGRAM

WEIGHT AND BALANCE COMPUTER APPARATUS FOR AIRCRAFT

BACKGROUND OF THE INVENTION

The present invention relates, in general, to aircraft instrumentation and control systems and, more particularly, to apparatus for computing the gross weight and center of gravity of the aircraft by measurements of the longitudinal axis and normal axis acceleration components in conjunction with air data parameters, pressure ratios or fan speeds of the engines and the positions of the flap-slat and horizontal stabilizer aerodynamic control surfaces. The aircraft gross weight signal, in conjunction with the flap-slat configuration of the lifting surface, is used for automatic determination of essential take-off speed references such as decision speed ($V_1$), rotation speed ($V_R$) and safety speed ($V_2$). The weight is also a basic parameter for the management of thrust, drag and lift during climb, cruise, letdown and holding patterns to obtain optimum fuel economy and optimum long range flight. It is also used for the determination of proper stall margin approach speeds.

An accurate measure of the center of gravity is useful when transfer of fuel between tanks is made during flight. It is generally desirable to maintain the center of gravity to be aligned with the center of aerodynamic lift on the wing since this will result in minimum load on the horizontal stabilizer and thus reduce aircraft drag. The center of gravity signal is also useful for controlling the mechanism which adjusts the elevator feel as reflected at the pilot's controls to maintain the stick force per unit of normal acceleration reasonably constant over the operating airspeed range of the aircraft.

Prior art techniques are based on an approximate knowledge of the empty weight of the aircraft and piece meal accounting of the weights and locations of the fuel and payloads that are added and subsequent totalizing of the fuel flow as it is consumed by the engines. This process is awkward since it does not lend itself to rapid updating of the weight and balance estimate and is subject to error because of initial empty weight, fuel and payload weight approximations and because of cumulative errors inherent in fuel flow rate integration and the density variaions of volumetric fuel flow measuring techniques. The present invention, on the other hand, is aimed at utilizing readily available, reliable and accurate aircraft sensors, the outputs of which are processed to generate instantaneous gross weight and balance signals which are not subject to these errors.

U.S. Pat. No. 3,691,356, titled Speed Command and Throttle Control for Aircraft, issued Sept. 12, 1972 to the present inventor and assigned to Sperry Rand Corporation, represents related prior art that discloses the automatic computation of gross weight from measures of parameters that are not dependent on estimates of empty aircraft weight or accounting of the status of fuel and payload. The technique disclosed in the prior patent, however, is only applicable to aircraft that are completely airborne. It is not capable of generating an accurate weight signal when all or part of the aircraft's weight is supported by the landing gear. The present invention differs from the previous aforementioned patent in that it utilizes a measure of the thrust generated on the aircraft by the engines and, as will be demonstrated, this additional data enables the aircraft weight to be determined very shortly after the start of the take-off run and thus is available for automatic and independent derivation of the critical take-off speed references $V_1$, $V_R$ and $V_2$ which are a function of the take-off gross weight of the aircraft, which references may then be used to automatically set the corresponding indices of an airspeed indicator for use by the pilot during the ground roll and take-off.

SUMMARY OF THE INVENTION

The apparatus of the present invention derives electrical signals that are proportional to aircraft gross weight and center of gravity based on electrical signals which are measures of longitudinal acceleration, normal acceleration, engine pressure ratio or engine fan speed, static pressure, Mach number, total air temperature, flap-slat position, and horizontal stabilizer position, as sensed by sensors normally aboard aircraft, these signals being applied as inputs to an analog or digital computer which provides a simultaneous solution of two mathematical relationships that relate force components acting on the aircraft in its longitudinal plane along two orthogonal aircraft axes, to the aircraft accelerations measured along the same respective axes. The simultaneous solution of these relationships by the computer results in electrical output signals which represent the instantaneous value of the gross weight of the aircraft as well as the location of its center of gravity.

BRIEF DESCRIPTION OF THE DRAWINGS

Preferred embodiments of the present invention are described and illustrated in the attached drawings, wherein:

FIG. 3 illustrates typical jet engine thrust characteristics as a function of static pressure ratio, engine pressure ratio and Mach number;

FIG. 4 illustrates typical jet engine thrust characteristics as a function of static pressure ratio, total temperature ratio, engine fan speed and Mach number;

FIG. 9 is a similar block diagram which illustrates a computer implementation of the angle of attack or alpha function computer section of FIG. 5;

FIG. 10 is a block diagram which illustrates a computer implementation of the weight computer section of FIG. 5;

FIG. 13 tabulates typical flap and Mach-dependent aircraft parameters required for weight and balance computation in accordance with the teaching of this invention;

FIGS. 14 and 15 tabulate typical alpha functions for various values of angle of attack at extreme center of gravity positions;

FIG. 18 tabulates typical alpha function coefficients based on relatively small excursions of angle of attack for various flap positions;

DESCRIPTION OF THE PREFERRED EMBODIMENTS

Before discussing the preferred embodiments of the apparatus of the present invention, a discussion of the various mathematical relationships and their derivations and a broad implementation of a computer configuration will be provided in order to facilitate an understanding of the preferred embodiments.

Figure 1:
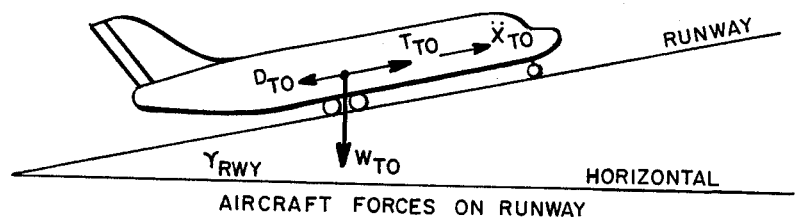
FIG. 1 illustrates the force acting on the aircraft during the take-off phase when all or part of the aircraft's weight is being supported by its landing gear.

FIG. 1 is used to derive a relationship between the aircraft weight, the thrust applied to the aircraft and the acceleration sensed by a longitudinal accelerometer that is mounted along an aircraft axis that is parallel to the engine thrust vector. The following definitions of symbols apply to FIG. 1:

$T_{TO}$ is the sum of the take-off thrusts of the separate engines mounted on the aircraft;

$W_{TO}$ is the take-off gross weight of the aircraft; $\gamma_{RWY}$ is the slope angle of the runway with respect to the local horizontal plane;

$D_{TO}$ is the sum of the frictional and aerodynamic drag forces of the aircraft when moving along the runaway;

$\ddot{x}$ is the acceleration of the aircraft along the runway;

$a_x$ is the output of a linear accelerometer mounted parallel to the aircraft longitudinal axis;

$g$ is the acceleration due to the earth gravity.

The net force acting along the longitudinal axis results in an acceleration of the aircraft along the runway as follows:

$$T_{TO} - W_{TO} \sin \delta_{RWY} - D_{TO} = \frac{W_{TO}}{g} \ddot{x}_{TO} \quad (1)$$

The longitudinal accelerometer detects not only the acceleration $\ddot{x}_{TO}$ but also responds to the component of the earth gravity (g) along the longitudinal axis as follows:

$$a_x = \ddot{x}_{TO} + g \sin \delta_{RWY} \quad (2)$$

The substitution of equation 2 into equation 1 expressing $D_{TO}$ as a function of aerodynamic drag and accounting for the aircraft rolling friction, combined with a mathematical arrangement to solve for $W_{TO}$ results in the following relationship:

$$W_{TO} = \frac{T_{TO} - C_D \left(\frac{1}{2} \rho V^2\right) S}{\frac{A_{x_{TO}}}{g} + \mu_{RL}} \quad (3)$$

where

S is aircraft wing area $C_D$ is the coefficient of aerodynamic drag $\rho$ is the density of the air V is the velocity of the aircraft relative to the wind $\mu RL$ is the coefficient or rolling friction of the aircraft.

In computing weight prior to take-off, the aerodynamic drag in the numerator of equation 3 can be ignored since the computation is made when forward velocity is low. This is assured by computing the weight only during a short time interval after the brakes are released and the engine pressure ratios have achieved values which are some relatively large fraction of the limit take-off value; for example 0.90 EPRL. This usually occurs within a few seconds after brake release. The value of coefficient of rolling friction $\mu_{RL}$ is a known quantity for a specific airplane. Since thrust, longitudinal acceleration and rolling friction are known or measured and since aerodynamic drag can be ignored, the value of $W_{TO}$ can be derived by implementing the right side of equation 3, minus the aerodynamic parameters, employing analog or digital computation apparatus. It should be noted that the use of a longitudinal accelerometer output results in making equation 3 independent of the slope of the runway. Such $W_{TO}$ computer implementation is disclosed in FIG. 11 and will be discussed fully below.

Determination of the Gross Weight of the Aircraft

Figure 2:
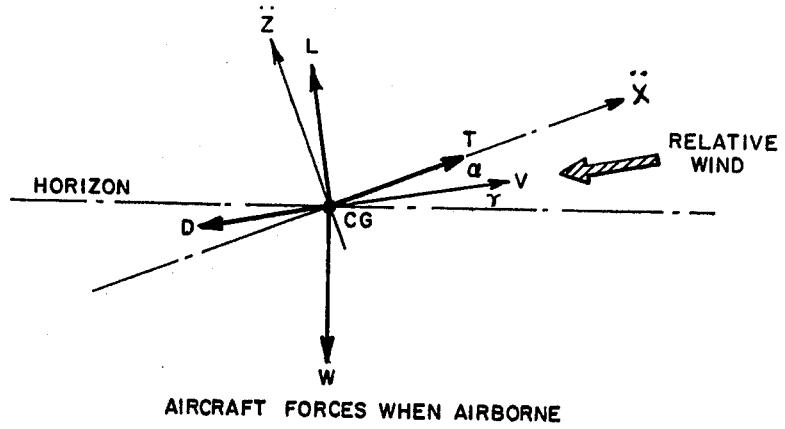
FIG. 2 illustrates the forces acting at the center of gravity of the aircraft when the aircraft is completely airborne.

FIG. 2 is a vector diagram of the forces acting on the airborne aircraft referenced to the craft's c.g. and can be used to derive two fundamental relationships which involve exactly two dependent variables, one of which is the instantaneous gross weight of the aircraft. The computer of the present invention therefore solves these equations simultaneously using analog or digital computation techniques to derive a measure of airborne aircraft weight. FIG. 2 illustrates the forces that are exerted on the center of gravity (CG) of the aircraft and the acceleration components that result from these forces along the aircraft orthogonal longitudinal and normal axes. The following definitions of symbols apply to FIG. 2:

T is the sum of the thrusts of the separate engines mounted on the aircraft;

W is the gross weight of the aircraft;

L is the aerodynamic lift on the aircraft;

D is the aerodynamic drag on the aircraft;

$\ddot{x}$ is the acceleration component along the aircraft's longitudinal axis which is parallel to the thrust vector;

$\ddot{z}$ is the acceleration component along the aircraft's normal axis which is orthogonal to the longitudinal axis;

V is the velocity along the aircraft flight path which is parallel to the direction of the relative wind;

$\alpha$ is the angle of attack which is the angle between the aircraft longitudinal axis and the relative wind; and δ is the flight path angle which is the angle between the relative wind and the local horizontal plane.

The net force acting along the aircraft longitudinal axis results in a corresponding acceleration component as follows:

$$T + L \sin\alpha - D\cos\alpha - W\sin\theta = \frac{W}{g}\ddot{x} \quad (4)$$

where $\theta$ is the angle between the aircraft longitudinal axis and the local horizontal plane as measured in a vertical plane which includes the longitudinal axis. This angle is usually referred to as aircraft pitch angle.

The net force acting along the aircraft normal axis results in a corresponding acceleration component as follows:

$$L\cos\alpha + D\sin\alpha - W\cos\theta\cos\phi = \frac{W}{g}\ddot{z} \quad (5)$$

where $\phi$ is the angle between the aircraft normal axis and the vertical plane which contains the aircraft longitudinal axis. This angle is usually referred to as aircraft roll angle.

Since linear accelerometers which are mounted parallel to the aircraft longitudinal and normal axes are used in the present invention to supply $a_x$ and $a_z$ signals, they detect not only the respective $\ddot{x}$ and $\ddot{z}$ accelerations respectively, but also respond to earth gravity components so their signal outputs are:

$$a_x = \ddot{x} + g\sin\theta \quad (6)$$

$$a_z = \ddot{z} + g\cos\theta\sin\phi \quad (7)$$

The aerodynamic lift and drag forces can be expressed in conventional lift coefficient ($C_L$) and drag coefficient ($C_D$) form as follows:

$$L = C_L qS \quad (8)$$

$$D = C_D qS \quad (9)$$

where $$q = \text{dynamic pressure or } 0.7\, p_s M^2 \quad (10)$$

and where
$p_s$ is static pressure
$M$ is Mach number

The substitution of equations 6 through 10 into equations 4 and 5 combined with a mathematical rearrangement results in the following basic relationships:

$$W = (C_L\cos\alpha + C_D\sin\alpha)(.7 p_s M^2 S)\left(\frac{g}{a_z}\right) \quad (11)$$

$$\frac{C_L\sin\alpha - C_D\cos\alpha}{C_L\cos\alpha + C_D\sin\alpha} = \left(\frac{a_x}{g} - \frac{T}{W}\right)\left(\frac{g}{a_z}\right) \quad (12)$$

An examination of equations 11 and 12 reveals that they involve exactly two dependent variables which are gross weight W and angle of attack α. This results because static pressure ($p_s$), Mach number (M), normal acceleration ($a_z$), longitudinal acceleration ($a_x$), and thrust (T) are all independently measured. It should be further recognized that lift coefficient ($C_L$) and drag coefficient ($C_D$) of a specific airplane are uniquely determined as a function of angle of attack, Mach number, flap-slat position and horizontal stabilizer position; and last three of which can also be independently measured. Thus, the aircraft weight computer apparatus of the present invention is configured to solve simultaneously equations 11 and 12 for the dependent variables W and α using electrical signals provided by sensor devices responsive to the independent variables just recited. Since the thrust T is one of these independent variables, a discussion of engine characteristics which enable a measure thereof is briefly provided.

FIGS. 3 and 4 illustrate typical jet engine characteristics. The curves of FIG. 3 represent a jet engine type which uses the ratio of exit total pressure to inlet pressure (EPR) as its basic thrust measuring parameter while FIG. 4 applies to a jet engine type which uses fan speed percent ($N_1$) as its basic thrust measuring parameter. The present invention is applicable to both. These characteristics illustrate that the thrust T of a specific engine is uniquely determined if the static pressure ratio $\delta_{AM}$, total temperature ratio $\theta_T$, Mach number and engine pressure ration (EPR) or engine fan speed $N_1$ are independently measured. Since these parameters are all predetermined or are directly measurable, the thrust of each engine on the craft may be precisely determined, as will be described below.

Figure 5:
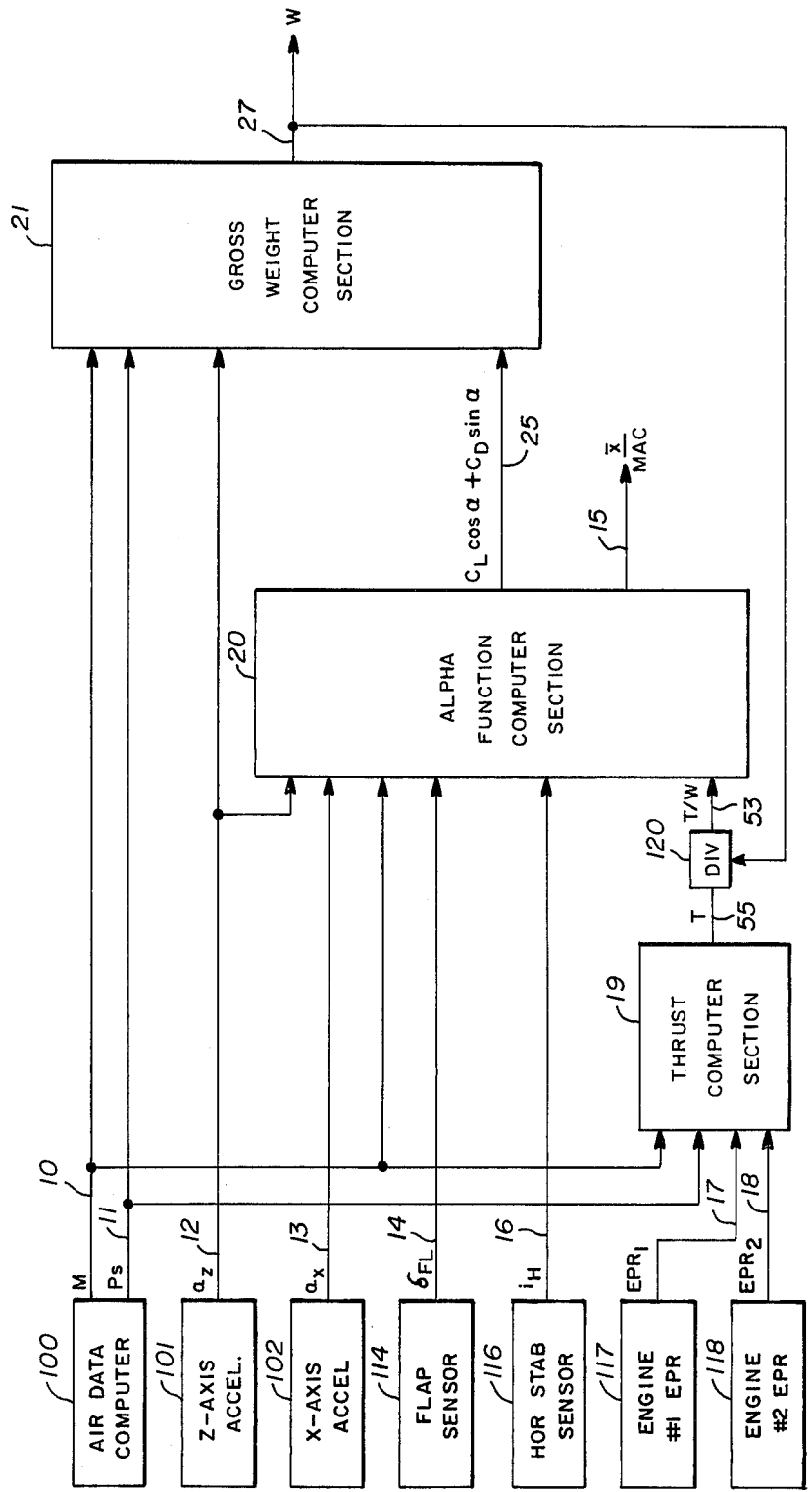
FIG. 5 is a block diagram of the basic apparatus used for the computation of the aircraft gross weight and center of gravity electrical signals.

FIG. 5 is a computer block diagram of the present invention which is used to solve the above equations 11 and 12 simultaneously. The independent variables are electrical computer input signals on leads 10 through 14 and 16 through 18.

Each of these electrical signals is provided from an onboard sensor of the parameter indicated. The Mach and static pressure signals on leads 10 and 11 are derived from a conventional air data sensor 100 and the longitudinal and normal acceleration signals $a_x$ and $a_z$ are derived from respective x-axis and z-axis accelerometers 101 and 102, preferably mounted as close to the aircraft center of gravity as possible. The movable aerodynamic surfaces affecting the aircraft coefficient of lift $C_L$ are the flaps and horizontal stabilizer and signals proportional to the positions of these surfaces are provided by suitable sensors (such as synchros geared thereto) 114, and 116, respectively. Lastly, the signals proportional to each engine's pressure ration (EPR) are provided by conventional sensors of these parameters 117 and 118.

The Mach and static pressure signals on leads 10, 11 and the EPR signals on leads 17 and 18 for a two-engined aircraft, are supplied as inputs to a thrust computer 19 which converts these electrical inputs into an electrical output on line 55 which is proportional to the composite thrust on the aircraft in accordance with the characteristics shown in FIG. 3 when the particular engine is an EPR type. If the engine is a fan type, the signals on leads 17 and 18 would represent engine fan speeds $N_1$ rather than engine pressure ratios. The general form of mathematic relationship for the thrust characteristics of an EPR type engine can be derived empirically as polynominals of a sufficiently high order to obtain the required accuracy, i.e., a conventional curve fitting technique. The following polynominal is typical:

$$F_n = 18700\, \delta_{AM}(a - bM + CM^2) \quad (13)$$

$$a = -0.3848 + 0.5753\,(\text{EPR}) \quad (14)$$

$$b = 0.823 - 0.2852\,(\text{EPR}) + 0.0699\,(\text{EPR})^2 \quad (15)$$

$$c = 0.5138 + 0.1125\,(\text{EPR}) \quad (16)$$

where

M = Mach number $$\delta_{AM} = \frac{p_s}{2116}$$

(2116 = standard sea level atmosphere on standard day in pounds per square foot).

$F_n$ = Thrust output of a single engine in pounds.

A detailed discussion of the generation of the thrust signal T will be given below in connection with FIG. 8.

It will be appreciated by those skilled in the digital computer art that the solution of equation 13 may be made with a very high degree of accuracy since precise engine polynomial coefficients defined by the curves of FIGS. 3 or 4 may be stored in a read only memory and programmed into the processor to provide a very accurate, measure of $F_n$.

Referring again to FIG. 5, the input signals to the alpha function computer 20 comprise those on lines 10, 12, 13, 14, 16 and 53. These signals from their corresponding sensors are proportional to Mach number (M), normal acceleration ($a_z$), longitudinal acceleration ($a_x$), flap position $\delta_{FL}$, horizontal stabilizer position $i_H$ and thrust-to-weight ration (T/W), respectively. The latter signal is generated using a feedback technique by a division through divider 120 of the thrust computer output signal on lead 55 by the weight computer output signal W on line 27, the generation of which will be described below in connection with FIG. 10. The alpha or angle of attack function computer 20 processes the input signals, as will also be described below in connection with FIG. 9, to generate an output signal on line 25 that is equal to the quantity ($C_L \cos \alpha + C_D \sin \alpha$) and also an output signal on line 15 that is proportional to center of gravity position ($\bar{x}/MAC$).

The input signals to the gross weight computer 21 of FIG. 5 comprise those on lines 10, 11, 12 and 25 previously identified. These signals are processed in accordance with the requirements of relationship 11 to generate an electrical signal on line 27 which is proportional to aircraft weight W as will be described below in connection with FIG. 10.

From the foregoing it will be appreciated that the thrust computer 10 comprises a means for providing a signal or measure which varies in accordance with the thrust force on the aircraft provided by the engines, the alpha function computer 20 constitutes a means for providing signals or measures which vary as functions of the angle of attack of the aircraft; the weight computer 21 comprises a means for providing a signal or measure proportional to the actual gross weight of the aircraft, while the divider 120 responsive to the thrust and weight signals comprises a means for providing a signal or measure proportional to the thrust-to-weight ratio of the craft. The specific characteristics of one embodiment of these means will be set forth below in connection with FIGS. 8, 9 and 10, respectively.

Figure 6:
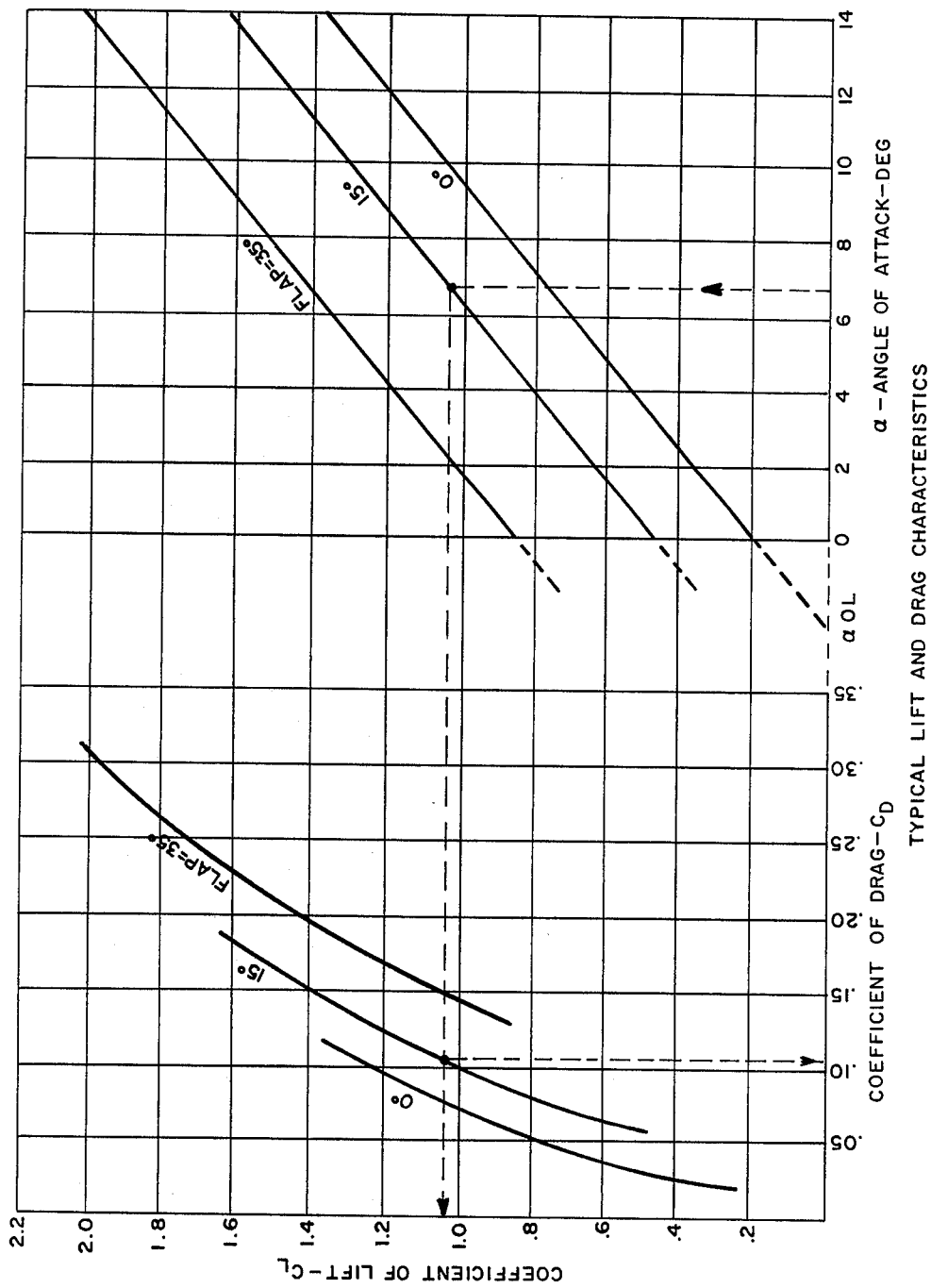
FIG. 6 illustrates typical aircraft lift and drag characteristics as a function of angle of attack and flap position.
Figure 7:
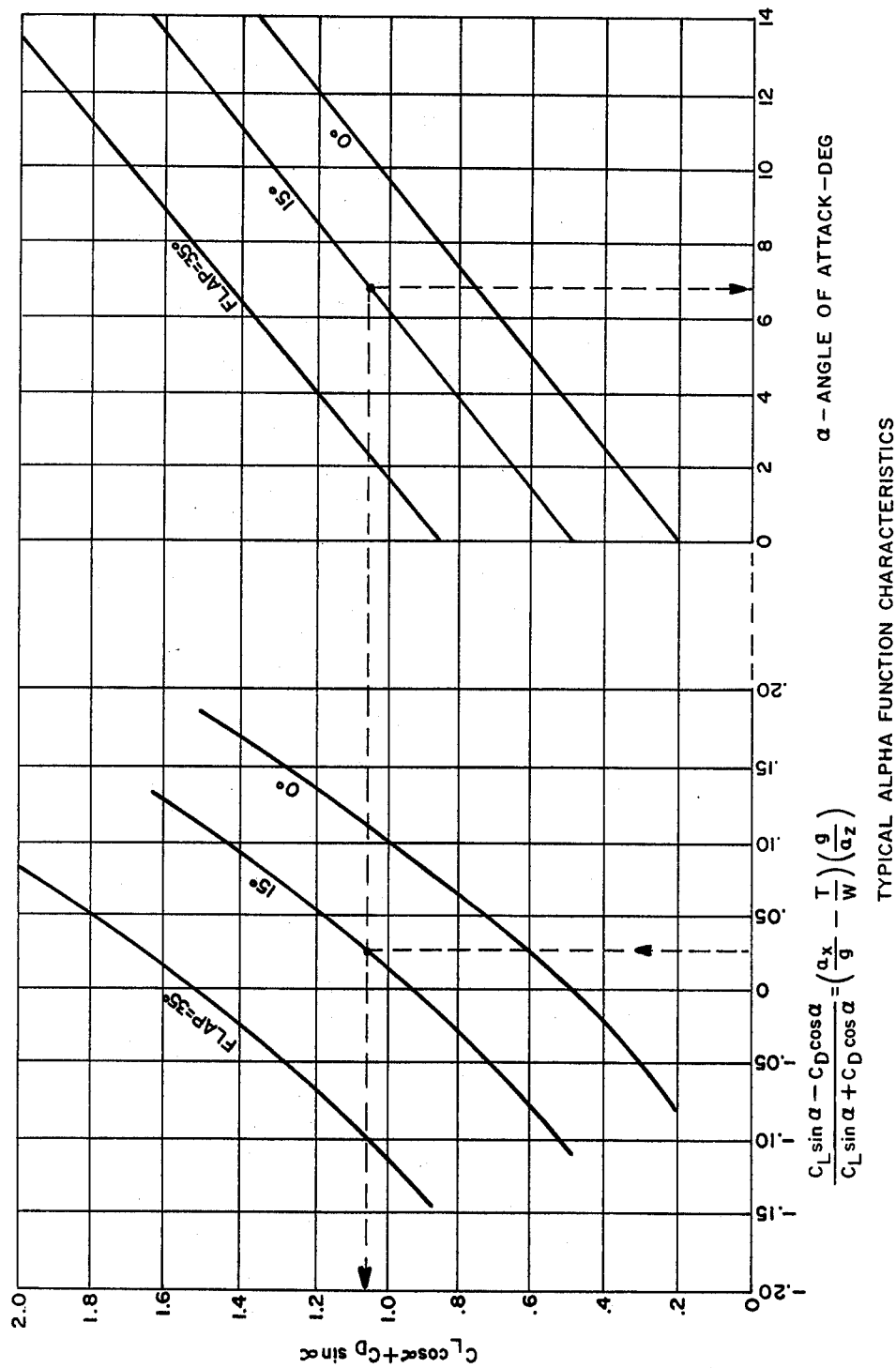
FIG. 7 illustrates angle of attack functions that are derived from the lift and drag characteristics shown in FIG. 6.

FIGS. 6 and 7 are useful in explaining the unique processing performed in the alpha function computer 20 to generate the signal or measure proportional to a function of the angle of attack of the aircraft. FIG. 6 is a nomograph which illustrates that typical lift and drag characteristics of an aircraft are dependent functions of two independent variables, viz, angle of attack $\alpha$, and flap postion $\delta_{FL}$. In the normal range of operation of the aircraft, (Mach number and altitude) these characteristics can be expressed as follows:

$$C_L = C_{l_\alpha}(\alpha - \alpha_{OL}) \qquad (17)$$

$$C_D = C_{D_o} + k_D C_L^2 \qquad (18)$$

where $C_{L_\alpha}$ is the derivative of $C_L$ with respect to alpha. This value varies with center of gravity position and Mach number;

$\alpha_{OL}$ is the angle of attack at zero lift. This value varies with flap position;

$C_{D_o}$ is the coefficient of profile drag. This value varies with flap-slat position and Mach number; and $k_D$ is the coefficient of induced drag. This value varies with Mach number.

Thus, it will be appreciated that curves of FIG. 6 represent one of a family of curves corresponding to a particular flight condition or aircraft environment.

From an examination of these typical curves, it will be appreciated that for a given value of angle of attack $\alpha$ and a given flap position $\delta_{FL}$, specific values of $C_L$ and $C_D$ may be determined, and from these latter values a nomograph may be derived in which the values of $C_L$ and $C_D$ are transformed to $$C_L \cos \alpha + C_D \sin \alpha \qquad (19a)$$

and $$\frac{C_L \sin \alpha - C_D \cos \alpha}{C_L \cos \alpha + C_D \sin \alpha} \qquad (19b)$$

FIG. 7 illustrates such a nomograph. Note that as a result of this transformation, the set of curves have a flatter slope therby providing a more accurate curve fitting computation process. More particularly, it is recognized that the relationship 19b is equal to the right hand side of equation 12 above and that therefore, since its value can be independently computed, the nomograph accordingly uses the function $$\left(\frac{a_x}{g} - \frac{T}{W}\right)\left(\frac{g}{a_z}\right)$$

and flap position $\delta_{FL}$ as the independent variables to determine the dependednt variables which are ($C_L \cos \alpha + C_D \sin \alpha$) and angle of attack $\alpha$. As a typical example, consider the flight condition wherein the independent variables are:

$$\left(\frac{a_x}{g} - \frac{T}{W}\right)\left(\frac{g}{a_z}\right) = .025,$$

and $$\delta_{FL} = 15°$$

The resulting values for ($C_L \cos \alpha + C_D \sin \alpha$) and angle of attack $\alpha$ are 1.05 and 6.8°, respectively, following the arrowed dotted lines of the figure.

In generating a precise measure of the function of angle of attack given in 19a above, a number of aerodynamic effects must be considered. One of these is the effect of the aircraft center of gravity and Mach number.

Figure 12:
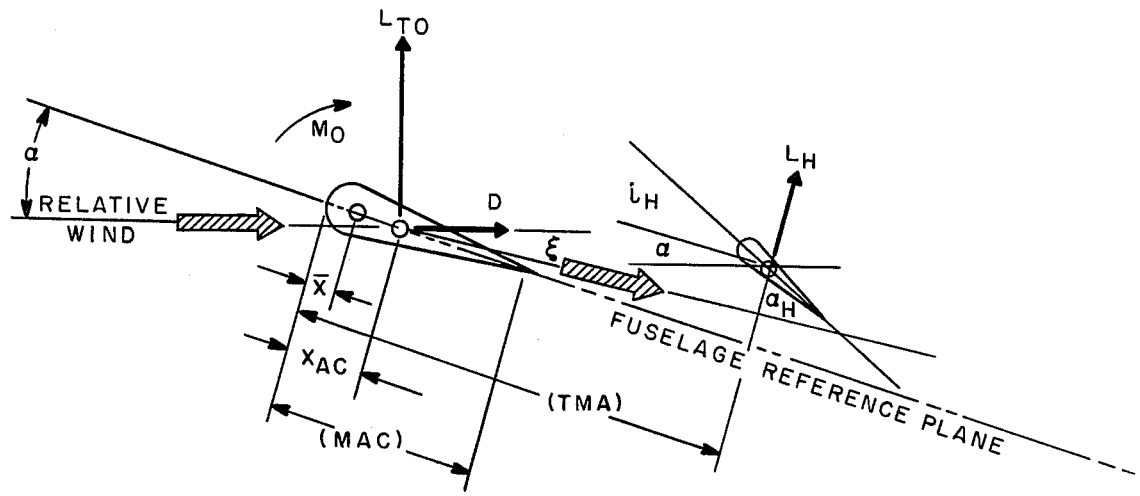
FIG. 12 diagrammatically represents the longitudinal aerodynamic forces and moments on the aircraft due to the combined action of the wing and tail.

The curves of FIGS. 6 and 7 are applicable to a specific center of gravity position and Mach number. It is necessary to consider the effect of varying center of gravity position and Mach number in order to obtain the necessary precision for determining weight and balance in accordance with the teachings of this invention. FIG. 12 which illustrates the aerodynamic forces and moments on the aircraft wing and horizontal stabilizer can be used to analyze the effect. The following definitions of symbols are applicable to FIG. 12:

$L_{TO}$ = Tail Off Aerodynamic Lift
D = Aircraft Aerodynamic Drag
$M_o$ = Aircraft Aerodynamic Pitching Moment at Zero Lift
$\alpha$ = Fuselage Angle of Attack
$\xi$ = Downwash Angle
$i_H$ = Horizontal Stabilizer Incidence Angle with respect to the Fuselage
$\alpha_H$ = Downwash Angle of Attack on Horizontal Stabilizer
(MAC) = Mean Aerodynamic Chord
(TMA) = Distance Between Horizontal Stabilizer Pivot and Leading Edge of MAC
$X_{AC}$ = Location of Aerodynamic Center along MAC
$\bar{x}$ = Location of Center of Gravity Along MAC
$L_H$ = Horizontal Stabilizer Aerodynamic Lift Normal to Downwash Flow $$L_H = C_{L_H} q S_H = C_{L\alpha_H} \alpha_H q S_H \quad (20)$$

where:
$C_{L_H}$ is the stabilizer coefficient of lift
$C_{L\alpha_H}$ is the derivative of $C_{L_H}$ with respect to $\alpha_H$ p1 $S_H$ is the area of the horizontal stabilizer
q is dynamic pressure The aerodynamic lift on the tail produces a force, $L_H$, at the pivot of the horizontal stabilizer causing a pitching moment about the aerodynamic center which can be expressed as:

$$-L_H(TMA - X_{AC}) = C_{m_{iH}} \alpha_H q S (MAC) \quad (21)$$

where:

$$C_{m_{iH}} = \left(\frac{TMA - X_{AC}}{MAC}\right)\left(\frac{S_H}{S}\right) C_{L\alpha_H} \quad (22)$$

The net pitching moment about the aircraft center of gravity is:

$$M_{CG} = M_o - (X_{AC} - X)(L_{TO}\cos\alpha + D\sin\alpha) - L_H(TMA - x) \quad (23)$$

The following relationships and equation (21) can be substituted into equation (23):

$$M_o = C_{m_o}(MAC) q S$$
$$L = C_L q s$$
$$D = C_D q S$$
$$L_{TO} = L - L_H$$

This will result in the following:

$$M_{CG} = (MAC) q S \left\{ C_{m_o} - (C_L \cos\alpha + C_D \sin\alpha)\left(\frac{X_{AC} - \bar{x}}{MAC}\right) + C_{m_{iH}} \cdot \alpha_H \right\} \quad (24)$$

When the aircraft is in trim, $M_{CG} = 0$, resulting in the following:

$$\alpha_H = \left\{ \left(\frac{X_{AC} - \bar{x}}{MAC}\right)(C_L\cos\alpha + C_D\sin\alpha) - C_{m_o} \right\} \frac{1}{C_{m_{iH}}} \quad (25)$$

Figure 8:
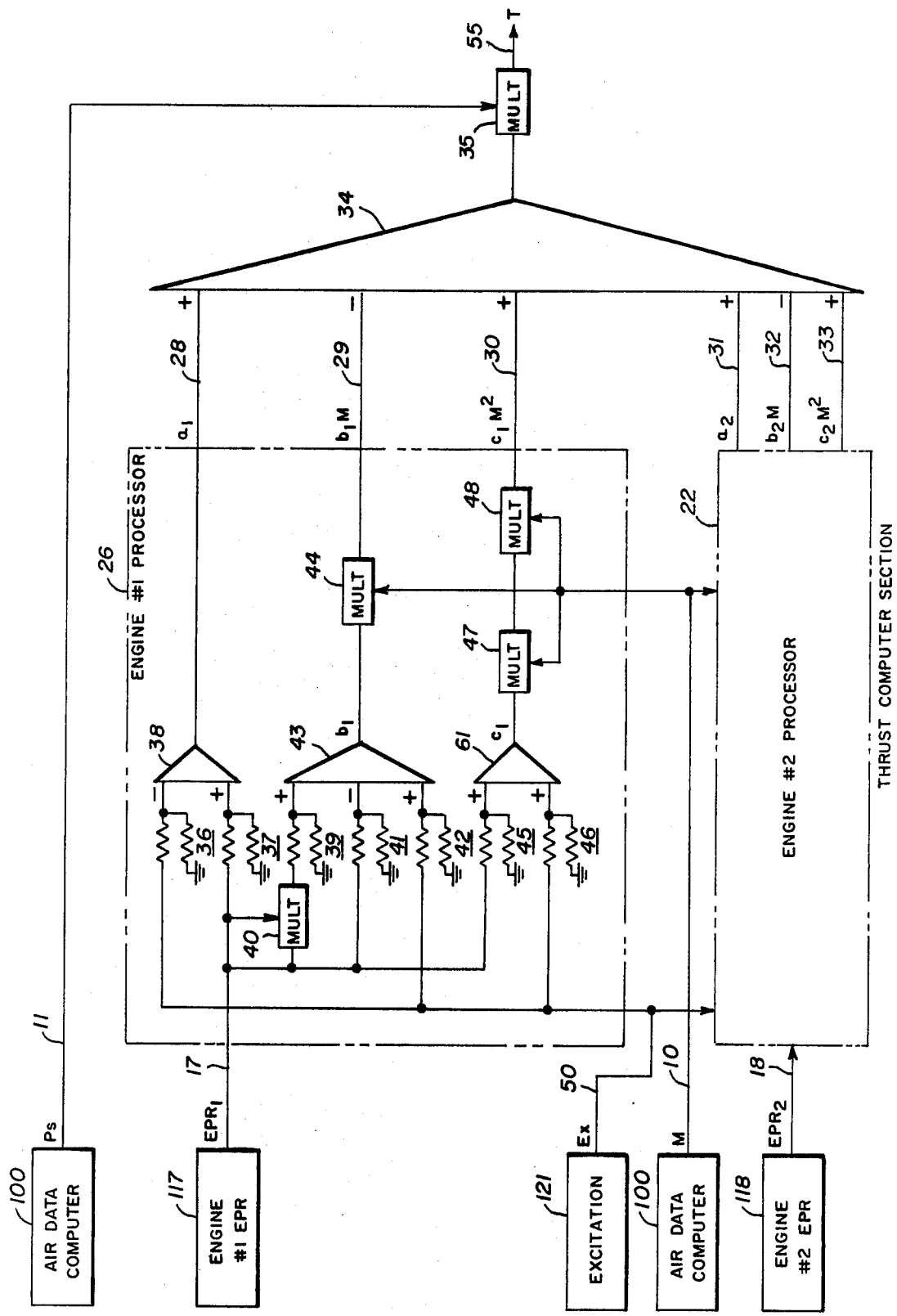
FIG. 8 is a block diagram which illustrates a computer implementation of the thrust computer section of FIG. 5.

An inspection of the geometry of FIG. 8 indicates that:

$$\alpha_H = \alpha + i_H - \epsilon \quad (26)$$

The downwash angle $\epsilon$ can be expressed as follows:

$$\epsilon = \epsilon_o + \epsilon_\alpha \alpha \quad (27)$$

where
$\epsilon_o$ is the downwash angle at zero angle of attack
$\epsilon_{\xi 0}$ is the derivative of the downwash angle with respect to angle of attack.

The substitution of equation 26 and 27 into 25 and rearrangement to solve for stabilizer position results in the following relationship:

$$i_H = \left\{ \left(\frac{X_{AC} - \bar{x}}{MAC}\right)(C_L\cos\alpha + C_D\sin\alpha) - C_{m_o} \right\} \frac{1}{C_{m_{iH}}} + \xi_o - \alpha(1 - \xi\alpha) \quad (28)$$

Equation 28 enables the stabilizer position to be determined using specific values of angle of attack, center of gravity position, flap position, and other applicable parameters which vary with Mach number. The Mach sensitive parameters are $X_{AC}$, $C_{M_o}$, $C_{m_{iH}}$, $\epsilon_o$, $\epsilon_\alpha$, $C_L$, $C_{D_O}$ and $k_D$.

The flap sensitive parameters are $C_{m_o}$, $\epsilon_o$, $C_{L\alpha}$, $\alpha_{OL}$ and $C_{D_O}$. FIG. 13 summarizes the effects of flap position and Mach number on the applicable parameters which are required for computation of weight and balance for a typical airplane.

The parameters given in FIG. 13 can be used to compute $C_L$, $C_D$ and $i_H$ as functions of angle of attack for specific cases of flap position. Mach number and the extreme center of gravity positions, using equations 17, 18 and 28. The values of $C_L$, $C_D$ and $\alpha$ can then be used to derive values for:

$$C_L \cos\alpha + C_D \sin\alpha \quad (29)$$

$$\frac{C_L \sin\alpha - C_D \cos\alpha}{C_L \cos\alpha + C_D \sin\alpha} = \left(\frac{a_x}{g} - \frac{T}{W}\right)\left(\frac{g}{a_z}\right) \quad (30)$$

Figure 16:
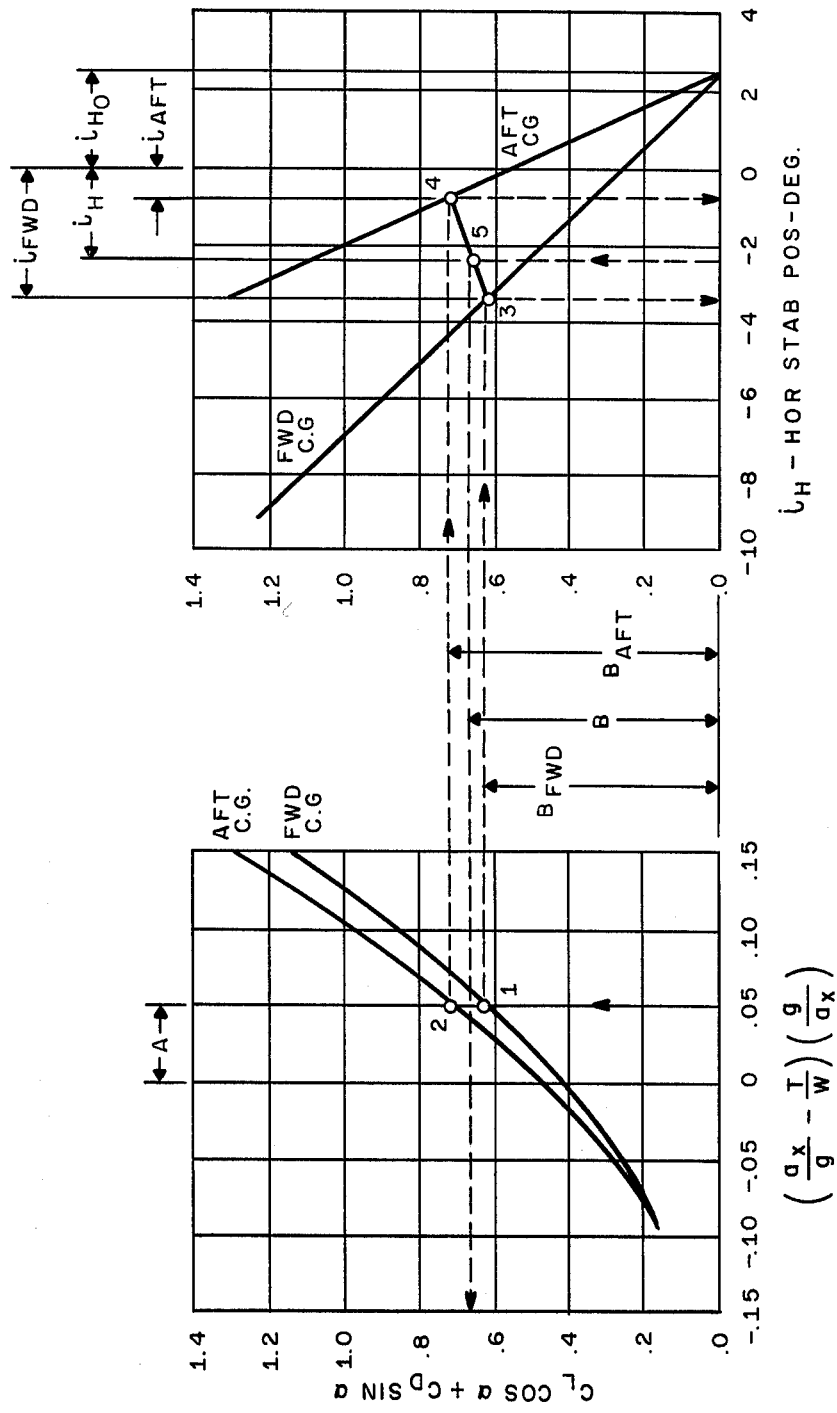
FIG. 16 illustrates the alpha function variation with center of gravity location.

FIGS. 14 and 15 summarize the results of these calculations for a representative case of a plurality of typical conditions set forth in FIG. 13. FIG. 14 tabulates the indicated data when the flaps are retracted, Mach number equals 0.4 and the center of gravity is in its extreme forward position along the means aerodynamic chord. FIG. 15 tabulates the same data for a similar condition except that the center of gravity is in its extreme aft position. The tabulations of FIGS. 14 and 15 are illustrated in graphical form in FIG. 16. The left side of FIG. 16 shows plots of the function $C_L \cos \alpha + C_D \sin \alpha$ against the independent variable $$\left(\frac{a_x}{g} - \frac{T}{W}\right)\left(\frac{g}{a_z}\right)$$

which is equal to $$\frac{C_L \sin \alpha - C_D \cos \alpha}{C_L \cos \alpha + C_D \sin \alpha}$$

in accordance with equation 12 as explained above. The right side of FIG. 16 shows plots of the function $C_L \cos \alpha + C_D \sin \alpha$ against the independent variable $i_H$. Clearly, similar figures can be generated for each of the cases tabulated in FIG. 13. The method for mechanizing a computer configuration that will generate the alpha function for the general case where flap position, horizontal stabilizer position, Mach number, engine EPR, static pressure, longitudinal acceleration and normal acceleration are independent variables is suggested by the graphical solution for the specific example illustrated in FIG. 16. As noted in FIG. 16, consider the specific case where $$\left(\frac{a_x}{g} - \frac{T}{W}\right)\left(\frac{g}{a_z}\right)$$

is equal to 0.05 and the horizontal stabilizer position is −2.4 degrees. The left hand abscissa value of 0.05 intercepts the left hand forward CG position at point 1 and the aft CG position at point 2. These ordinate values intercept the right hand or stabilizer position characteristics at points 3 and 4, respectively. A straight line is drawn between points 3 and 4. The right hand abscissa value of −2.4 (horizontal stabilizer position) intercepts the latter line at point 5, the ordinate of which represents the value of $(C_L \cos \alpha + C_D \sin \alpha)$ for the specific case where Mach is 0.4, the flaps are retracted, the horizontal stabilizer position is −2.4 degrees and the function $$\left(\frac{a_x}{g} - \frac{T}{W}\right)\left(\frac{g}{a_z}\right)$$

equal .05.

For specific values of $C_{m_o}$, $C_{m_{iH}}$, $\epsilon_o$ and $\epsilon_\alpha$ equation 28 will result in a zero lift value of horizontal stabilizer position which is independent of center of gravity position. For example, consider the situation illustrated in FIG. 16. It is seen that the two plots on the right side intersect at a horizontal stabilizer position, designated $H_o$ when $C_L \cos \alpha + C_D \sin \alpha$ is zero. From equation 28 this value will be $$H_o = -\frac{C_{m_o}}{C_{m_{iH}}} + \epsilon_o - \alpha_{OL}(1 - \epsilon_\alpha) \tag{31}$$

Using the values tabulated in FIG. 13 for zero flap position and M = 0.4; $H_o$ = 2.31 degrees.

In general, it is not necessary to consider the entire range of Mach numbers, angles of attack and flap positions for the cases lited in FIG. 13. thus for Mach numbers that are typically less than 0.4, the effects of Mach can be neglected and the range of steady state angle of attack can be restricted to values that are typically between five and ten degrees. For Mach numbers that are typically greater than 0.4, the effects of flap position can be neglected and the range of steady state angle of attack can be restricted to values that are typically between two and five degrees. When these conditions are imposed, the characteristics shown at the left side of FIGS. 7 and 16 can be described as linear functions in the region of interest. This simplifies the analog implementation for generating a signal that is proportional to $C_L \cos \alpha + C_D \sin \alpha$. It should be understood that digital computer techniques are more versatile and can easily handle non-linear characteristics, if necessary.

Figure 17:
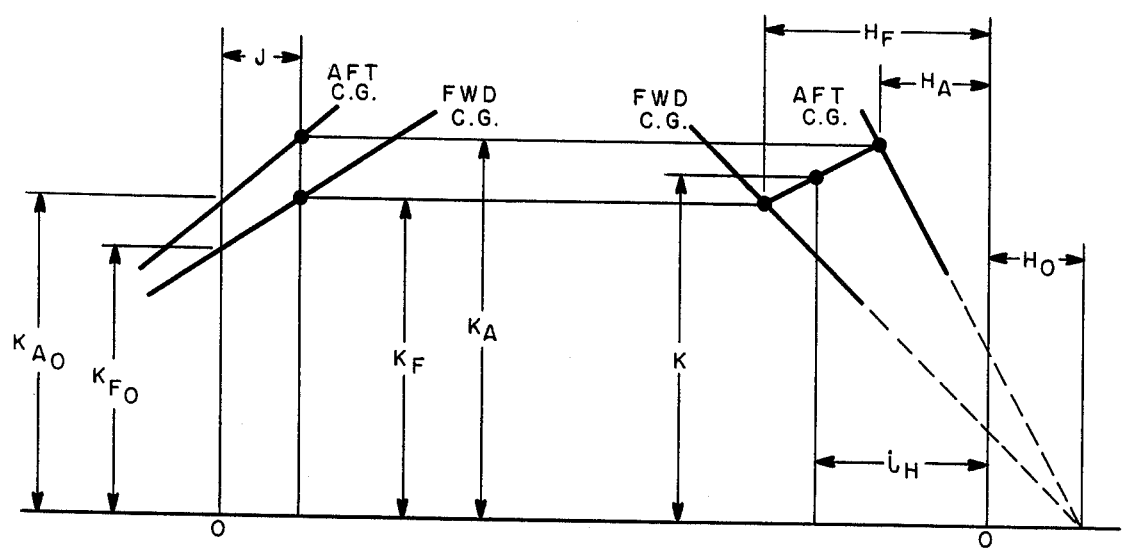
FIG. 17 illustrates alpha function characteristics based on relatively small excursions of angle of attack.

FIG. 17 illustrates the characteristics of the linear alpha function. For mathematical convenience let:

$$J = \frac{C_L \sin \alpha - C_D \cos \alpha}{C_L \cos \alpha + C_D \sin \alpha} = \left(\frac{a_x}{g} - \frac{T}{W}\right)\left(\frac{g}{a_z}\right) \tag{32}$$

$$K = C_L \cos \alpha + C_D \sin \alpha \tag{33}$$

The general solution to the problem illustrated in FIG. 17 relates to determining the value of K for independent inputs of J, stabilizer position $i_H$ and flap position or Mach number. The following discussion will show that the form of this solution is:

$$K = g + hJ + \left(\frac{a + bJ}{c + dJ}\right)(e + fJ - i_H) \tag{34}$$

where the coefficients a through h are functions of flap position for Mach numbers that are typically less than 0.4 and function of Mach number for Mach numbers that are typically greater than 0.4.

An examination of FIG. 17 indicates that:

$$K_F = K_{F_o} + j_F J = h_F(H_F - H_o) \tag{35}$$

$$K_A = K_{A_o} + j_A J = h_A(H_A - H_o) \tag{36}$$

$$K = K_A - \left[\frac{i_H - H_A}{H_F - H_A}\right][K_A - K_F] \tag{37}$$

where:
$K_F$ is the value of K for the extreme forward CG position at a specific value of J;
$K_A$ is the value of K for the extreme aft CG position at a specific value of J;
$K_{F_o}$ is the value of K for the extreme forward CG position when the value of J is zero;
$K_{A_o}$ is the value of K for the extreme aft CG position when the value of J is zero.
$j_F$ is the slope of the K-J characteristic for the extreme forward CG position;
$j_A$ is the slope of the K-J characteristic for the extreme aft CG position;
$h_F$ is the slope of the K-$i_H$ characteristic for the extreme forward CG position;
$h_A$ is the slope of the K-$i_H$ characteristic for the extreme aft CG position;

$H_F$ is the value of $i_H$ for the extreme forward CG position at a specific value of J;

$H_A$ is the value of $i_H$ for the extreme aft CG position at a specific value of J;

$H_o$ is the value of $i_H$ when K is zero.

Through conventional mathematical manipulation it is easily proved that:

$$K_A - K_F = a + bJ \tag{38}$$

$$H_F - H_A = c + dJ \tag{39}$$

$$H_A = e + fJ \text{ tm} \tag{40}$$

$$K_A = g + hJ \tag{41}$$

where:

$$a = K_{A_o} - K_{F_o} \tag{42}$$

$$b = jA - jF \tag{43}$$

$$c = \frac{K_{F_o}}{h_F} - \frac{K_{A_o}}{h_A} \tag{44}$$

$$d = \frac{jF}{h_F} - \frac{jA}{h_A} \tag{45}$$

$$e = \frac{K_{A_o}}{h_A} + H_o \tag{46}$$

$$f = \frac{jA}{h_A} \tag{47}$$

$$g = K_{A_o} \tag{48}$$

$$h = jA \tag{49}$$

The substitution of equations 38 through 41 results in the relationship 34. FIG. 18 tabulates the alpha function coefficients $a$ through $h$ that correspond to the typical flapdependent aircraft parameters that are listed in FIG. 13. A similar tabulation can be generated to correspond with the Mach dependent parameters of FIG. 13. The data shown in FIG. 18 is representative of the function generator requirements that are described for the implementation of the polynomial curve fitting function generator 54 of FIG. 9.

Determination of Center of Gravity Position

As noted previously, it is desirable to have a knowledge of the position of the center of gravity of the aircraft as the fuel is burned off. The nomograph technique illustrated in FIG. 16 can be used for this determination. The relationship of point 5 with respect to the forward CG position 3 and the aft CG position 4 is a measure of the actual center of gravity of the aircraft. This can be expressed as follows:

$$\frac{\bar{x}}{MAC} = \frac{\bar{x}_{AFT}}{MAC} + \left(\frac{\bar{x}_{AFT} - \bar{x}_{FWD}}{MAC}\right)\left(\frac{e + fJ - i_H}{c + dJ}\right) \tag{50}$$

For the specific case illustrated in FIG. 16:

$$\frac{\bar{x}_{AFT}}{MAC} = .305; \quad \frac{\bar{x}_{FWD}}{MAC} = .100$$

Equation 35 will then become:

$$\frac{\bar{x}}{MAC} = .305 + .205 \left(\frac{e + fJ - i_H}{c + dJ}\right)$$

where $c$, $d$, $e$, $f$ and $J$ are the same functions as described for equation 34.

Having now set forth the basic principles upon which the weight and balance computer apparatus of the present invention operates and a general block diagram of a computer for carrying out these principles, a preferred detailed embodiment of the invention will be described in which analog computation techniques are employed. The same reference characters will designate corresponding elements of the basic block diagram of FIG. 5. It will be understood, of course, that the same principles may be embodied in apparatus where the computations involved may be performed by a suitably programmed general purpose digital computer. An example of such a digital computer and Chapin chart from which a normally skilled programmer may prepare a program for such computer will be described below.

Thrust Computer Section

The details of the thrust computer section 19 of FIG. 5 is illustrated in FIG. 8. The block diagram represents the summation of the thrusts of the individual engines mounted on the aircraft, which in this embodiment is based on an aircraft which has two engines of the EPR type having characteristics similar to those shown in the curves of FIG. 3. The configuration, of course, can be expanded to cover any number of engines. Separate and identical processors 26 and 22, are provided for each engine. The following discussion relates primarily to engine processor 26; the processors for the other engine or engines being similar.

The signal inputs to each engine processor are regulated excitation voltage on line 50 from a suitable source 121, Mach on line 10 from computer 100 and a measure of engine pressure ratio (EPR) from sensors 117 on line 17. The processor employs a conventional curve fitting technique and reflects a polynomial fit of the thrust characteristics of the curves of FIG. 3, using the general relationships of equations 13 through 16, as previously discussed. Thus, the outputs of the processor 26 are signals $(a_1)$ on line 28, $(b_1M)$ on line 20 and $(C_1M^2)$ on line 30. The equivalent output signals for the second engine processor 22 are $(a_2)$ on line 31, $(b_2M)$ on line 32 and $(C_2M^2)$ on line 33. It will be understood that to achieve a desired accuracy it may be necessary to expand the polynominals to higher orders. These signals are summed with the polarities shown by amplifier 34. Since engine thrust is a function of static pressure $p_s$ or altitude, the output is operated on by a multiplication circuit 35, the multiplier being a signal proportional to $p_s$ in accordance with equation 13 to obtain an output signal T on line 55 which represents the thrust T exerted on the aircraft. The $p_s$ signal is provided on lead 11 from air data computer 100 and is scaled to include the standard day sea level constant 2116.

Voltage dividers 36, 42 and 46 which are connected to the regulated excitation voltage on lead 50 provide the constant terms of equations 14, 15 and 16, respectively, while the voltage dividers 37, 41 and 45 which are connected to the EPR input line 17 provide the corresponding terms in equations 14, 15 and 16 which are proportional to EPR. The voltage divider 39 is connected to multiplier 40 which squares the EPR signal and provides the remaining term of equation 15. Signal amplifier 38 sums the terms which comprise equation 14; signal amplifier 43 sums the terms which comprise quation 15; and signal amplifier 61 sums the terms which comprise equation 16. Higher order polynomials may be solved using the same curve fitting technique. The foregoing describes the curve fitting technique referred to above and constitutes a means responsive to engine operating characteristics for providing a signal or measure proportional to the thrust exerted on the aircraft. The same general curve fitting technique will be used in the alpha function computer 30 described below.

Alpha Function and Center of Gravity Position Computer Section

The alpha function computer section of FIG. 5 is generally illustrated in FIG. 9. The purpose of this section is to convert the measurable and therefore independent variables $$\left(\frac{a_x}{g} - \frac{T}{W}\right)\left(\frac{g}{a_z}\right),$$

flap-slat position, horizontal stabilizer position and Mach number into dependent outputs which are equal to ($C_L \cos \alpha + C_D \sin \alpha$) and center of gravity position $$\frac{\bar{x}}{MAC}$$

in accordance with the requirements of relationships 34 and 50, respectively. The inputs to the alpha function computer are on lines 12, 13, 53, 14, 16 and 10 representing the measurable quantities normal acceleration, longitudinal acceleration, thrust to weight ratio, flap-slat position, horizontal stabilizer position and Mach number, respectively. The $$\frac{a}{x} \text{ and } \frac{T}{W}$$

signals on lines 13 and 53 are summed with the polarities shown through amplifier 51, the output of which is operated upon by the $a_z$ signal on line 12 through divider 52 to obtain an output signal from divider 52 which is proportional to the variable $$\left(\frac{a_x}{g} - \frac{T}{W}\right)\left(\frac{g}{a_z}\right).$$

In accordance with equation 12, this signal is equivalent to equation 19 and thus is an independent input to the polynomial curve fitting function generator 54. The other independent inputs are on lines 14, 16 and 10.

Figure 19:
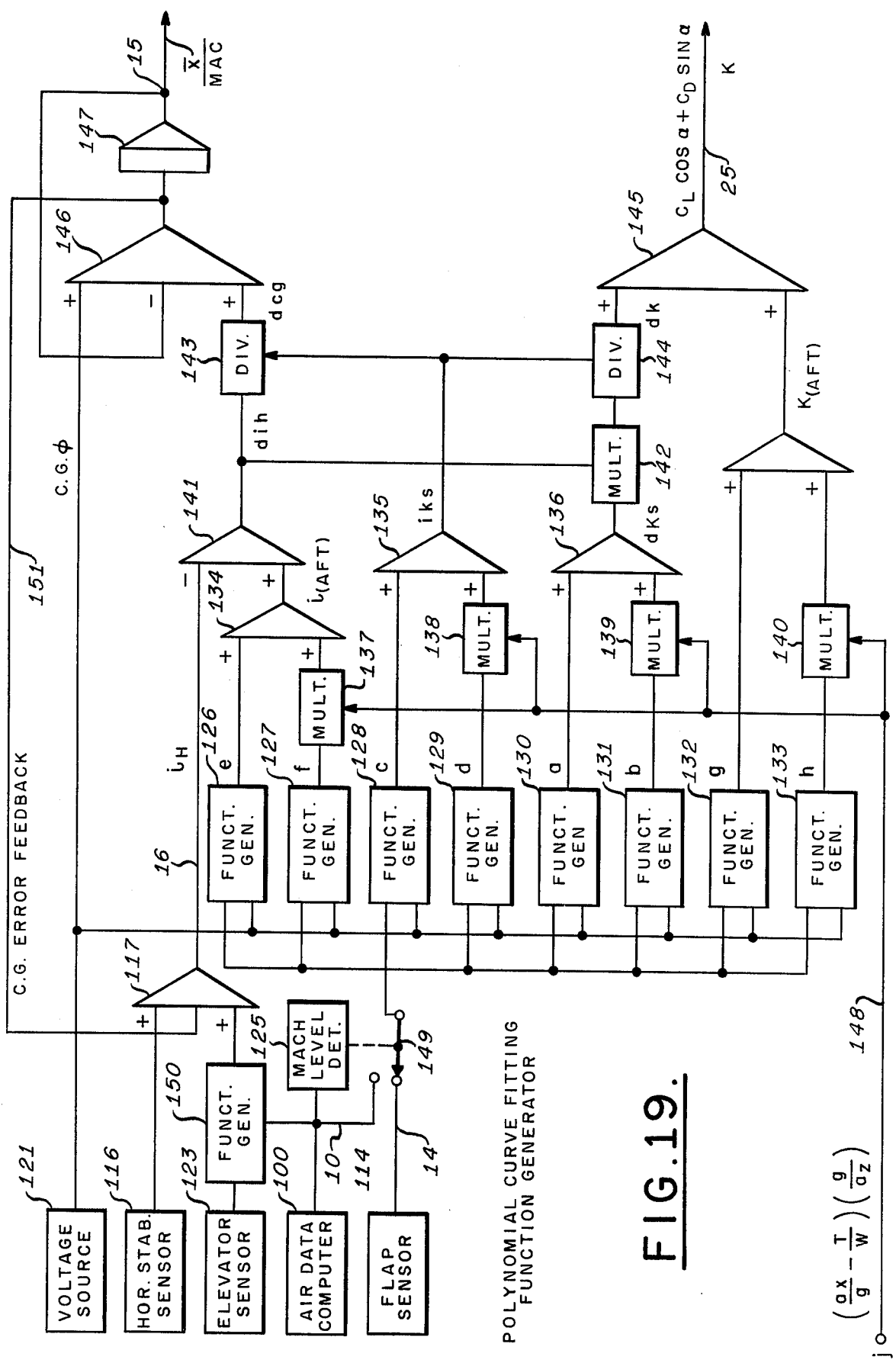
FIG. 19 is a block diagram which illustrates an analog computer implementation of the polynomial curve fitting function generator of FIG. 9.

The implementation of function generator 54 is shown in greater detail in FIG. 19. The signal on line 148 of FIG. 19 is the output of divider 52 of FIG. 9 and represents a measure of $$\left(\frac{a_x}{g} - \frac{T}{W}\right)\left(\frac{g}{a_z}\right)$$

which has also been previously designated as signal $j$ for convenience. The function generators 126 through 133 derive electrical signals $a$ through $h$ in accordance with the typical requirements tabulated in FIG. 18. The inputs to the function generators are voltages from source 121 which are modified by either the output of flap sensor 114 on line 14 or the mach output 10 from air data computer 100. A mach level detector 125 switches from line 14 to line 10 at an appropriate Mach value through switch 149. The J signal on line 148 operates on the $h$, $b$, $d$ and $f$ outputs of function generators 133, 131, 129 and 12 through multipliers 140, 139, 138 and 137 to generate signals proportional to $Jh$, $Jb$, $Jd$ and $Jf$, respectively. The $Jf$ signal is combined with the $e$ signal from function generator 126 through summing amplifier 134 to generate a signal $e + fJ$. Similar combinations are performed by summing amplifiers 135 and 136 to generate signals $c + dJ$ and $a + bJ$. The signal $g$ from function generator 132 and the signal $Jh$ are sent directly to summing amplifier 145 where they are combined with a signal that represents $$\left(\frac{a + bJ}{c + dJ}\right)(e + fJ - i_H)$$

and thus generates a signal proportional to the value K = $C_L \cos \alpha + C_D \sin \alpha$ in accordance with the requirements of relationship 34. The signal $e + fJ - i_H$ is derived from the outputs of signal amplifiers 134 and 141 in cascade, the output of 141 going to multiplier 142 and to divider 143, the output of which is an input to the center of gravity section of the computer. Dividers 144 and 143 are operated on by the $c + dJ$ output of amplifier 135 in accordance with the respective requirements of relationships 34 and 50.

The $i_H$ input to amplifier 141 on line 16 is the output of amplifier 117 and represents the combined pitching moment effect of the horizontal stabilizer movement and the elevator movement. The relative outputs of horizontal stabilizer sensor 116 and elevator sensor 123 are in proportion to the effectiveness of each to produce a pitching moment. This is a function of Mach number and is implemented by function generator 150. The output of summing amplifier 146 reflects the requirements of relationship 50 by virtue of an input from voltage sorce 121 and the output of divider 143 which represents a voltage proportional to $$\frac{e + fJ - i_H}{c + dJ}.$$

It should be noted that the values $$\frac{\bar{x}_{AFT}}{MAC} \text{ and } \frac{\bar{x}_{FWD}}{MAC}$$

of relationship 50 represent extreme center of gravity positions and are constant for a specific airplane.

The function of integrator 147 with its feedback on line 15 to amplifier 146 is to provide a relatively long time constant filter, for example, on the order of onehalf to one minute, on the center of gravity signal. This is justified since center of gravity of the aircraft will change relatively slowly. The CG error feedback signal 151 at the output of amplifier 146 is used to correct for dynamic effects of short term elevator movements in a manner similar to that described for the weight error feedback signal of the gross weight computer section now to be described.

Gross Weight Computer Section

The gross weight computer section 21 of FIG. 5 is illustrated in FIG. 10. This weight computer implementation is in general similar to the weight computer implementation disclosed in the present inventor's aforementioned Patent 3,691,356; specifically, that implementation disclosed in FIG. 9 thereof. however, the significant difference is that the latter weight signal computation implementation is based on a function of the coefficient of lift $C_L$ and lift-to-weight ratio L/W while in the present implementation the weight signal computation is based on a function of engine thrust T through the alpha function ($C_L \cos \alpha + C_D \sin \alpha$) derived therefrom, and a function of normal acceleration $a_z$. Basically, the apparatus of FIG. 10 of the present specification provides a solution of equation 11 above which, through the feedback of its output W to the divider 120 of FIG. 9 provides the simultaneous solution of equations 11 and 12.

In FIG. 10, the output of sum amplifier 49 is a signal proportional to ($C_L \cos \alpha + C_D \sin \alpha$) supplied to its input to the weight computer from the alpha function computer of FIG. 9, this signal being divided through divider 56 by a signal proportional to ($g/a_z$) as derived from z-axis accelerometer 101 scaled in accordance with g. The wing area constant S is provided as the gain of an amplifier and the output thereof is multiplied by $q$ from air data sensor 100, $q$ being of course equal to 0.7 $p_s M^2$. Thus, the signal at the upper input of amplifier 58 is proportional to aircraft weight W as defined by the right hand side of equation 11. The computed weight signal from amplifier 48 is applied to a low pass filter 59 and integrator 60, the output of which is fed back to amplifier 58, its output in turn being fed back to amplifier 49 via lead 63. The function of the filter 59, integrator 60 and feedbacks will now be briefly discussed. For a more detailed discussion of these functions, reference may be made to the referenced patent.

It will be noted that during the airborne computation of weight, at least some of the parameters employed are derived from inertial sensors and that therefore the weight computation may be in error during relatively short time intervals in the presence of winds relative to the ground (particularly aggravating would be wind shears). Furthermore, these inertial elements may contribute undesired dynamic or short term errors in the weight measurement (for example in rough air and turbulence). The function of the weight computer section feedbacks referred above are for the purpose of substantially reducing or eliminating these errors. In the airborne mode of operation it will be appreciated that the weight of the aircraft varies very, very slowly as fuel is burned off (dropping of stores as from military aircraft is easily taken care of since their weight is normally precisely known). This fact enables the combined filter 59 and integrator 60 time constant to be very, very long, for example on the order of 200 to 500 seconds. The output of integrator 60 therefore is a substantially steady state signal proportional to aircraft weight.

The negative feedback from the integrator 60 to the input of amplifier 58 effectively eliminates the long term weight component from its output whereby such output is a measure or signal which varies in accordance with any error between it and the original weight signal on lead 73, i.e., a weight error signal. Basically then this weight error signal includes primarily the dynamic errors noted above and may be used to correct the basic weight computer input data, as by the weight error feedback signal on lead 63 to the inpput of amplifier 49, to thereby provide a very precise measure of the airborne weight of the aircraft.

Ground Weight computer

One of the drawbacks or limitations of the weight computer of the present inventor's aforesaid patent is that since its basic computation parameter is coefficient of lift $C_L$, an accurate weight measure is obtainable only after the craft is airborne. Therefore, its output cannot be employed to automatically set, or used by the pilot to manually set, the required $V_1$, $V_r$ and $R_2$ take-off speeds. However, since the basic computation parameter of the present weight computer is engine thrust, a precision measure of aircraft weight is generated within a very few seconds after the brakes are released and the engines have achieved substantially their full thrust capability, that is when their EPR's have reached say 90% of their limit values, e.g., 0.90 EPRL. Normally, this EPR is reached within a very few hundred feet from brake release and/or application of take-off power, leaving the pilot or first officer plenty of time to set the $V_1$, $V_R$ and $R_2$ take-off speeds on his airspeed indicator. It is anticipated that future aircraft displays will be incorporated into integrated electronic cockpit displays, such as cathode ray tube displays or the like, in which case the output of the weight computer of the present invention may be automatically combined with stored aircraft manual take-off data and used to automatically set the $V_1$, $V_R$ and $V_2$ airspeed indices.

Figure 11:
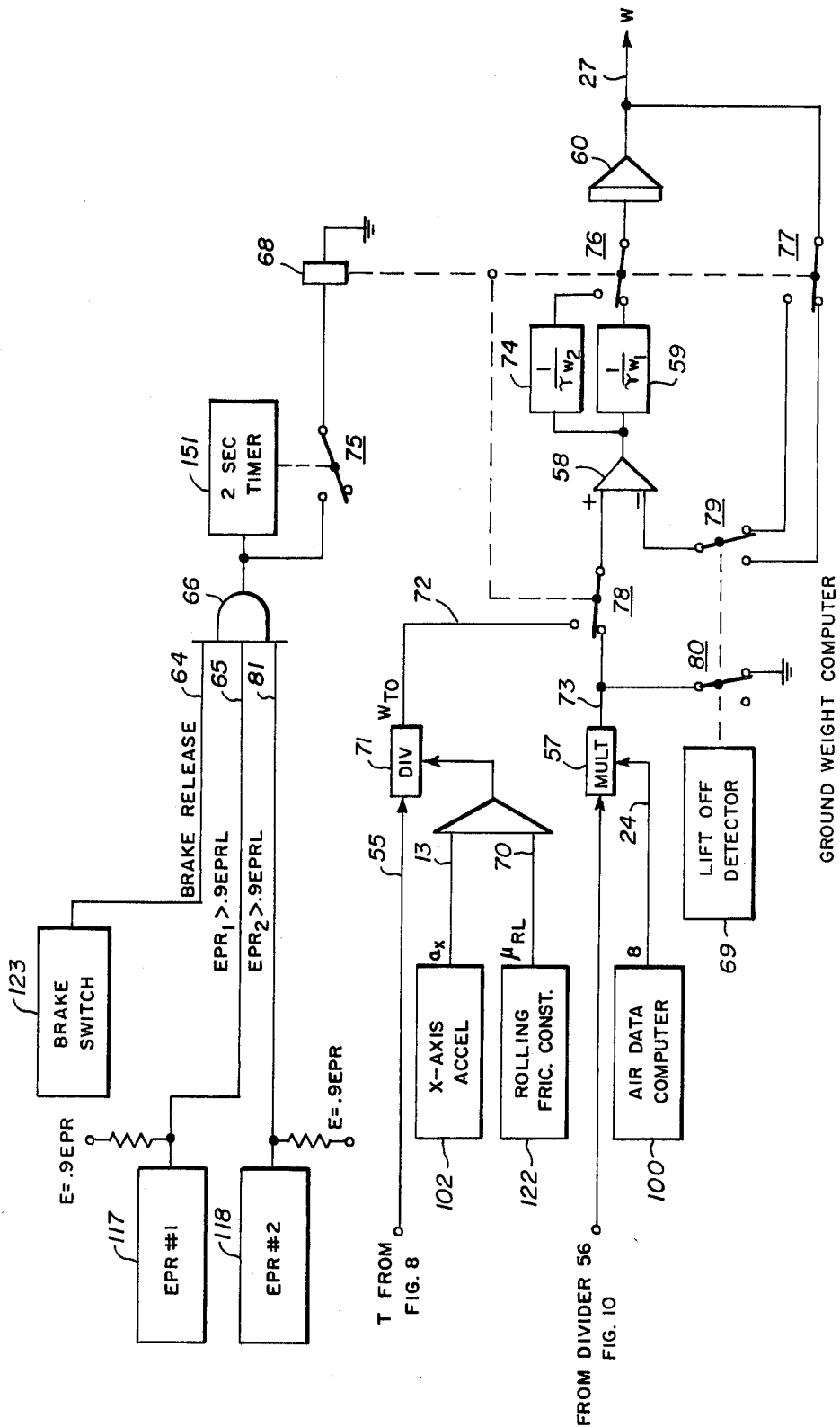
FIG. 11 is a block diagram which illustrates a computer implementation of the ground weight computer in accordance with requirements illustrated in FIG. 1.

FIG. 11 illustrates the modificatons required to integrate the requirements of take-off weight equation 3 with those required for the airborne weight equations 11 and 12 previously discussed with regard to FIG. 10. In general, the aerodynamic dependent parameters of the weight computer are momentarily removed and direct thrust, inertial and ground roll effective parameters, e.g., rolling friction, are substituted therefor. The apparatus associated with such removal and substitution constituting a means for converting the airborne weight computer to a take-off weight computer for providing the take-off weight signal. The take-off weight signal $W_{TO}$ apears on line 72 and is generated by using divider 71 to operate the thrust signal T on line 55 from the thrust computer section of FIG. 8 as the numerator and sum of ($a_x/g$) and $\mu_{RL}$ on lines 13 and 70, respectively, as the denominator. The ($a_x/g$) signal is provided by the x-axis accelerometer 102, while the $\mu_{RL}$ signal is provided from a reference signal source 122, the magnitude thereof being in general a constant proportional to the rolling friction of the landing gear, a parameter known or predeterminable from aircraft tow tests. The contacts 76, 77 and 78 of relay 68 serve to change the configuration of FIG. 10 such that the aerodynamic function input to summing amplifier 58 is rendered ineffective and the $W_{TO}$ signal on line 72 is substituted therefor whenever relay 68 is energized. Relay 68 need be energized for only a short period of time after the brakes are released and the engines have achieved EPR values which are close to those limit values required for take-off, e.g., 0.90 EPRL as described above. This switching logic is provided by discretes on lines 64, 65 and 81 from a brake switch 123 operated on brake release and from EPR sources 117 and 118 respectively, in conjunction with AND gate 66. Upon operation of gate 66, a timer 67 is energized closing contacts 75 which supplies a signal to energize relay 68. The timer is set to maintain the contacts 76, 77 and 78 in their actuated or upper positions for a short period of time, on the order of one to five seconds; just long enough for the initial acceleration to be established and the computer computations to settle out. Contact 76 is used to change the large airborne filter time constant $T_{W_1}$ to a very small value $T_{W_2}$, e.g., 0.5 sec. to permit the rapid computation of take-off weight.

The function of the lift off detector 69 is to return the weight computer configuration to that of FIG. 10 when the aircraft becomes airborne. The lift off detector logic could be, for example, an oleo switch or perhaps more significantly the attainment of safety speed $V_2$ in order to remove aerodynamic ground effect from affecting the airborne weight computation. Since the relay 68 is de-energized and switches 76, 77 and 78 are returned to their normal positions after the 1-5 sec. initial take-off weight computation is completed, switch 80 serves to ground the airborne weight computer input parameters so that they will not affect the take-off weight value, while switch 79 assures that the integrator 60 will remain clamped at the take-off weight value during the remainder of the ground roll and the attainment of $V_2$ safety speed.

As discussed earlier in this specification, the weight and balance computer apparatus of the present invention may include a general purpose digital computer suitably programmed to carry out the many computations herein above described in detail for providing the weight and center of gravity position outputs for use by the aircraft crew or as inputs to other aircraft equipments requiring these important parameters.

Figure 20:
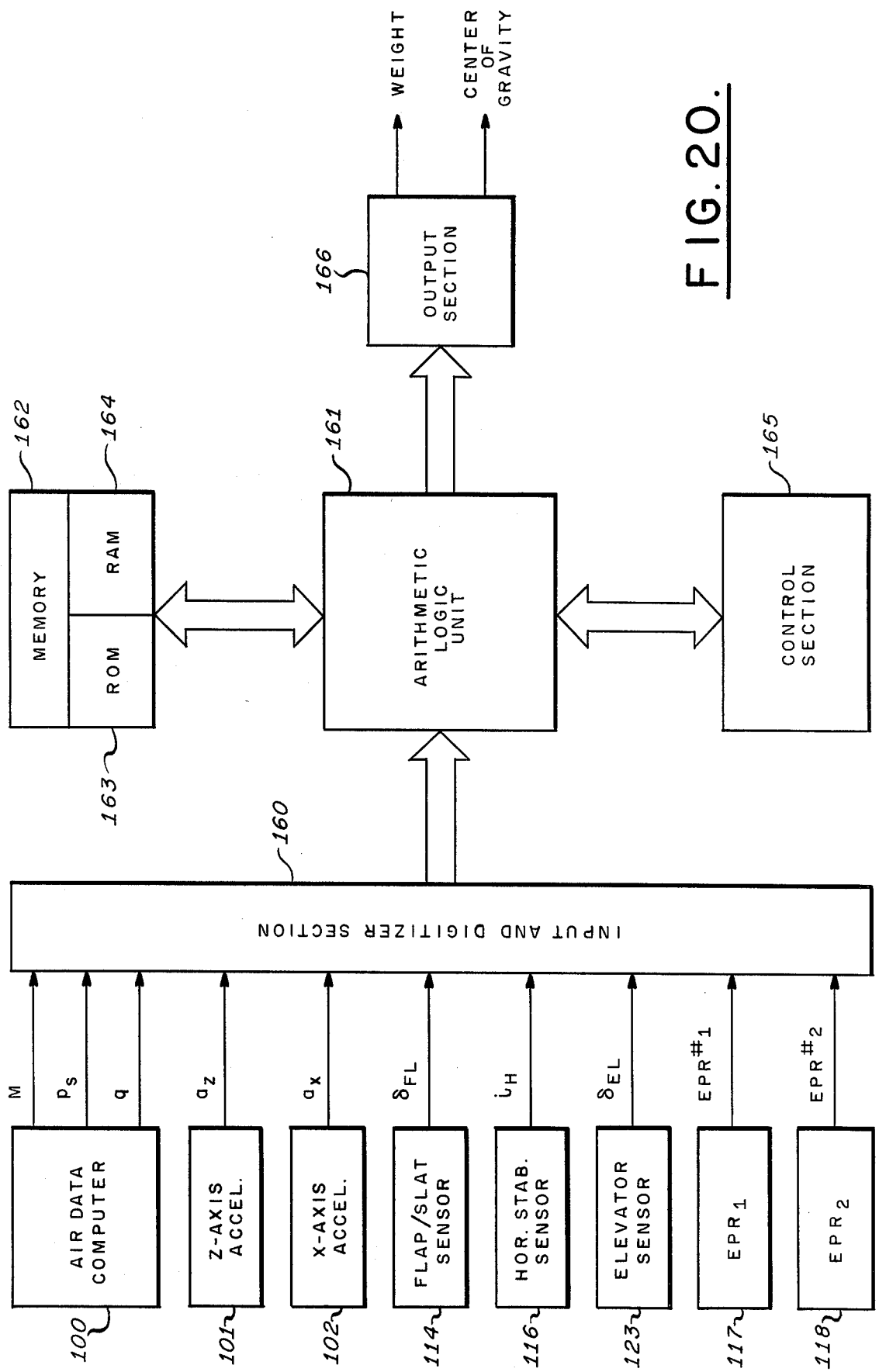
FIG. 20 is a block diagram of the system of the present invention in which is illustrated the elements of a conventional general purpose digital computer for performing the computations required by the present invention.

In FIG. 20 there is disclosed a block diagram of the system of the present invention which includes the basic elements of a general purpose digital computer. As illustrated, the variable input parameters required are illustrated as in FIG. 5 by corresponding reference characters. These variable signals are applied to an input section 160 where they are digitized and stored for use by the arithmetic logic unit 161 when called up by the program memory. The computer includes a memory 162 which may consist of a read only memory (ROM) 163 which performs two basic storage functions. It provides the over-all computer program and also includes the many aircraft fixed constants (as set forth in the tables and graphs disclosed in the drawings). The random access memory (RAM) 164 is used as a temporary storage of data, such as input data, output data, and intermediate data during the various computations performed by the arithmetic unit 161. The control section 165 is used to direct and control the arithmetic unit to perform this solution of the various equations described above in detail. The output section 166 receives digital weight and balance output data, e.g. from RAM 164, and converts it to analog form for user systems. Obviously, many user systems will require the weight and center of gravity signals in digital format whereby the output section 166 may transfer the digital data directly or convert it to whatever format is required by the user systems.

Figure 21:
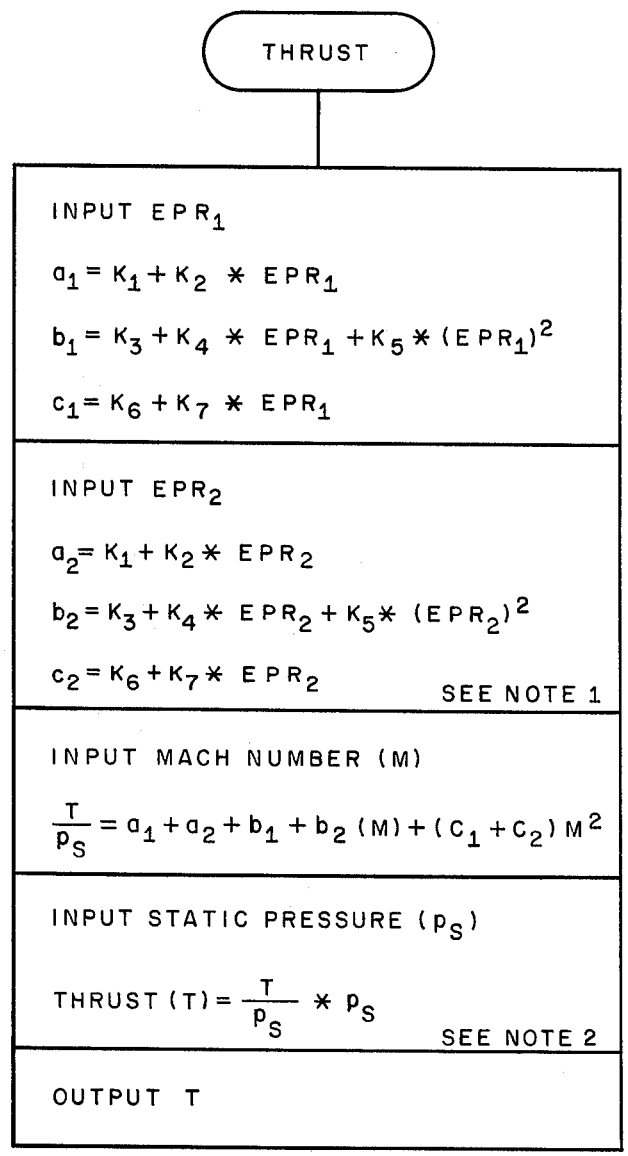
FIGS. 21 and 22 are program charts which may be used for programming the digital computer of FIG. 20.
Figure 22:
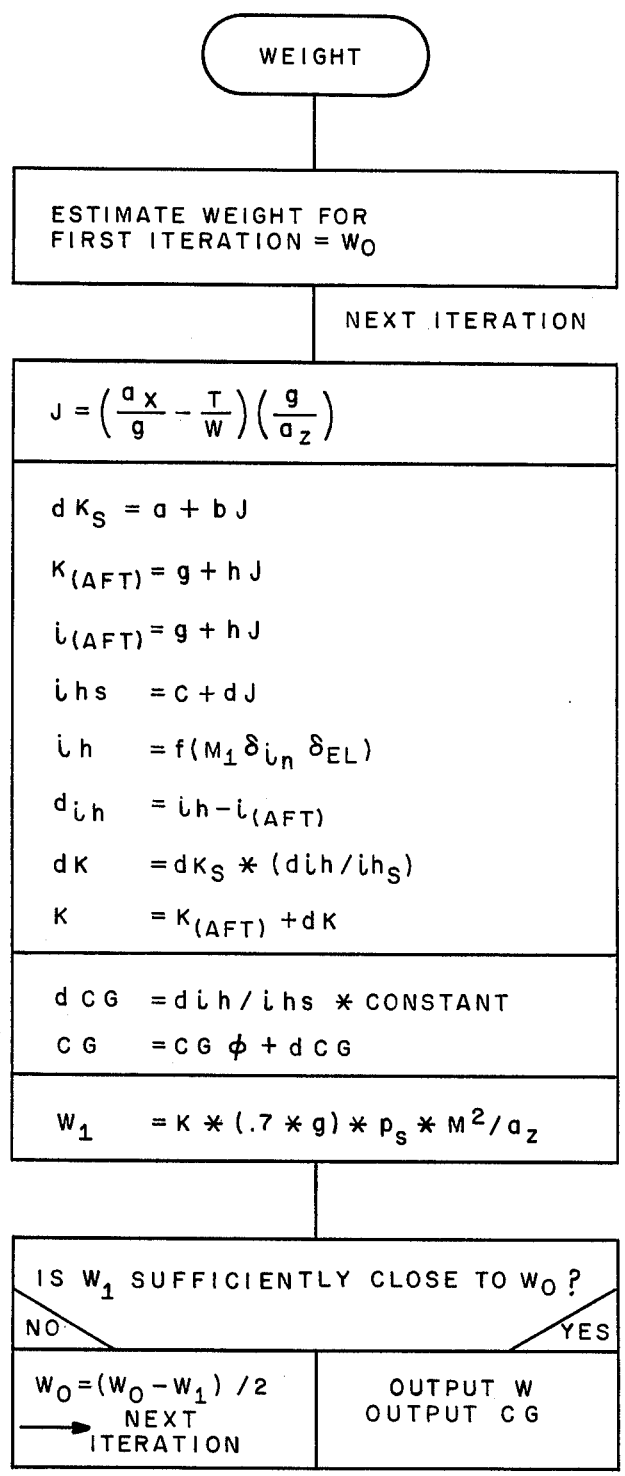

The computer of FIG. 20 may be programmed in accordance with the requirements of the conventional Chapin charts illustrated in FIGS. 21 and 22. Chapin charts are presently in extensive use by computer programmers in developing machine readable programs for the general purpose computer of FIG. 20. The notes regarding the chart of FIG. 21 are indicated therein. However, note (3) of the chart of FIG. 22 is set forth below.

(3) Several intermediate values are used in the gross weight computation. They are illustrated in FIGS. 16 and 19, the latter of which may be considered as a computer algorithm.

(a) $a, b, c, d, e, f, g$ and $h$ are each linear (or higher order if required for accuracy) functions of flap position and Mach number.

(b) K(aft) is the value of K with the given J input and with a full aft center of gravity.

(c) dKs is K(aft) minus a corresponding K(fwd), a full forward center of gravity.

(d) $i$(aft) is the value of $ih$ required for the input value of J and an aft center of gravity.

(e) ihs is i(aft) minus a corresponding i(aft).

(f) dih is ih minus i(aft).

(g) dK is K minus Kaft. Note that the program directions given in the chart of FIG. 22 define an iterative process for solving the basic simultaneous equations 11 and 12 above and several iterations may be required to achieve convergence.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for providing a measure of the gross weight of an aircraft having engines for providing propelling thrust therefor comprising
   a. means responsive to an operating characteristic of the engines for providing a measure of the thrust thereof,
   b. means responsive to aerodynamic forces acting on said aircraft and said measure of thrust for providing a measure of a function of the angle of attack of said aircraft, and
   c. means responsive to said angle of attack function measure for providing an output measure of the gross weight of said aircraft.

2. The apparatus as set forth in claim 1 wherein said engines are turbo-jet engines and said operating characteristic thereof is the engine pressure ratio.

3. The apparatus as set forth in claim 1 wherein said engines are turbo fan engines and said operating characteristic is the engine fan speed.

4. The apparatus as set forth in claim 1 wherein the thrust of said engines at a predetermined operating characteristic thereof vary as a predetermined function of the aircraft Mach number speed and altitude and wherein said thrust measure providing means comprises
   a. means providing a signal proportional to said engine operating characteristic,
   b. means providing signals respectively proportional to the aircraft Mach number speed and altitude, and
   c. means responsive to said last mentioned signals for modifying said engine operating characteristic signal in accordance with said predetermined function to provie said measure of engine thrust.

5. The apparatus as set forth in claim 4 wherein said engine operating characteristic is its engine pressure ratio.

6. The apparatus as set forth in claim 4 wherein the means for varying said engine operating characteristic comprises computer means responsive to said engine pressure ratio signal and said Mach number and altitude signals for computing the value of a polynominal with Mach number and having variable coefficients which are a function of said engine operating characteristic, multiplied by a function of altitude.

7. The apparatus as set forth in claim 1 further comprising
   a. means responsive to said aircraft gross weight measure and said thrust measure for providing a measure of the thrust-to-weight ratio of said aircraft, and
   b. means supplying said thrust-to-weight measure to said function of angle of attack measure providing means.

8. The apparatus as set forth in claim 7 wherein said function of angle of attack measure varies as a predetermined function of normal and longitudinal accelerations of said aircraft relative to earth gravity and its thrust-to-weight ratio at a predetermined condition of aircraft control surfaces affecting the lift and drag thereof and its Mach number speed, said function of angle of attack measure providing means comprising
   a. means providing a signal proportional to acceleration of said aircraft along its normal axis,
   b. means providing a signal proportional to acceleration of said aircraft along its longitudinal axis,
   c. means providing a signal proportional to the thrust-to-weight ratio of said craft,
   d. means responsive to said acceleration signals and said thrust-to-weight ratio signal for providing a resultant signal proportional to said predetermined function thereof, and
   e. means responsive to the position of said aircraft control surfaces and its Mach number speed for determining the value of said measure of said function of angle of attack for said control surfaces' position and Mach number speed.

9. The apparatus as set forth in claim 8 wherein the means for determining said measure of said function of angle of attack comprises computer means responsive to said acceleration, thrust-to-weight ratio, Mach number speed and said resultant signals for computing the value of K as a function J in accordance with the following equations:

$$J = \left(\frac{a_x}{g} - \frac{T}{W}\right)\left(\frac{g}{a_z}\right)$$

wherein
J = said resultant signal
$a_x$ and $a_z$ are the longitudinal and normal accelerations of the aircraft respectively
(T/W) = thrust-to-weight ratio of the aircraft
g = earth gravity acceleration,
wherein said control surface positions are
$\delta_{FL}$ = aircraft flap-slat position and
$i_H$ = horizontal stabilizer position and wherein said function of angle of attack is of the form $$K = C_L \cos \alpha + C_D \sin \alpha$$

wherein
K = measure of said angle of attack function
$\alpha$ = angle of attack of the aircraft, and
$C_L$ and $C_D$ = coefficients of lift and drag, respectively of the aircraft.

10. The apparatus as set forth in claim 1 wherein said aircraft gross weight measure is a predetermined function of said function of angle of attack, aircraft normal acceleration and dynamic air pressure and wherein said gross weight measure providing means comprises
   a. means responsive to said function of angle of attack measure for providing a signal in accordance therewith,
   b. means for providing a signal proportional to normal acceleration of said aircraft,
   c. means for providing a signal proportional to the dynamic pressure of said aircraft, and
   d. means responsive to said angle of attack function signal, said normal acceleration signal and said dynamic pressure signal for providing a signal proportional to the gross weight of said aircraft.

11. The apparatus as set forth in claim 10 wherein said last mentioned means comprises computer means responsive to said signals for providing a signal proportional to weight as a function of said signals in accordance with the equation $$W = (C_L \cos \alpha + C_D \sin \alpha)(.7 p_s M^2 S)((g/a_z))$$

wherein
W = aircraft gross weight
$\alpha$ = angle of attack of the aircraft
$C_L$ and $C_D$ are coefficients of lift and drag respectively, of the aircraft.
$0.7 p_s M^2$ = dynamic pressure, q
S = aircraft wing area
$a_z$ = normal acceleration of the craft
g = earth gravity acceleration 12. The apparatus as set forth in claim 10 wherein said gross weight signal includes undesired high frequency components included in said angle of attack function signal, further including
   a. means responsive to said gross weight signal for providing an output signal including only long term variations thereof
   b. means responsive to said long term weight signal and said gross weight signal including said high frequency components for providing a weight error signal, and
   c. means supplying said weight error signal to said weight measure providing means for reducing the effects of said high frequency components of said angle of attack measure in said aircraft gross weight signal.

13. The apparatus as set forth in claim 1 further including means providing an output measure of the take-off weight of said aircraft comprising
   a. means for providing a measure of the longitudinal acceleration of said aircraft,
   b. means responsive to said measure of the thrust of said aircraft and said longitudinal acceleration measure for providing a resultant measure of the take-off weight of the aircraft, c. switch means for substituting said resultant take-off weight measure for said angle of attack function measure to said weight measure providing means, and d. means responsive to a predetermined value of said engine operating characteristic for operating said switch means.

14. The apparatus as set forth in claim 13 wherein said aircraft is equipped with brakes on the landing gear wheels, said apparatus further including a. means responsive to release of said brakes for providing a corresponding signal, and b. logic means responsive to said predetermined value of said engine operating characteristic and said brake signal for operating said switch means.

15. The apparatus as set forth in claim 12 further including means providing an output measure of the take-off weight of the aircraft comprising a. means for providing a measure of the longitudinal acceleration of the aircraft, b. means responsive to said measure of thrust of said aircraft and said longitudinal acceleration measure for providing a resultant measure of the take-off weight of the aircraft.

c. first switch means for substituting said resultant take-off weight measure for said angle of attack function measure to said weight measure providing means, d. second switch means for rendering said long term weight variation signal and said weight error signal ineffective and substituting therefor the instantaneous value of said take-off weight signal, and e. means responsive to a predetermined value of said engine operating characteristic for operating both first and second switch means.

16. The apparatus as set forth in claim 13 further including a. timing means responsive to operation of said switch means for rendering said substitution of said take-off weight measure effective for only a short time period, on the order of one to five seconds, and for thereafter effectively clamping said take-off weight measure at the value then obtaining.

17. The apparatus as set forth in claim 16 further including:

a. Further switch means responsive to an airborne condition of said aircraft for reinstating said angle of attack function measure to said weight measure providing means.

18. The apparatus as set forth in claim 13 wherein said means for providing said resultant measure of take-off weight comprises computer means responsive to said measure of thrust and longitudinal acceleration for providing a measure proportional to take-off weight as a function of said signals in accordance with the equation $$W_{TO} = \frac{T_{TO}}{\frac{a_x}{g} + \mu RL}$$

where $W_{TO}$ = aircraft take-off weight
$a_x$ = longitudinal acceleration of the aircraft
$g$ = gravity acceleration
$\mu_{RL}$ = rolling friction of the aircraft 19. Apparatus for providing a measure of the take-off weight of an aircraft comprising a. means for providing a measure of an operating characteristic of the aircraft engines for providing a measure of the take-off thrust thereof, b. means for providing a measure of the longitudinal acceleration of the aircraft, c. means for providing a measure of the rolling friction of the aircraft, d. means responsive to said measures for providing an output measure of the take-off weight of said aircraft as a predetermined function of said signals, e. switch means for rendering said means responsive to said measures effective, and f. means responsive to a predetermined value of said engine operating characteristic for operating said switch means.

20. The apparatus as set forth in claim 19 wherein said predetermined function is of the form $$W_{TO} = \frac{T_{TO}}{\frac{a_x}{g} + \mu RL}$$

wherein $W_{TO}$ = aircraft take-off weight
$a_x$ = longitudinal acceleration of the aircraft
$g$ = gravity acceleration
$\mu_{RL}$ = rolling friction of the aircraft 21. The apparatus as set forth in claim 19 further including, a. timing means responsive to the operation of said switch means for rendering said take-off weight measure providing means effective for only a short period of time, on the order of one to five seconds, and b. means responsive to said timing means for effectively clamping said take-off weight measure at the value then obtaining.

22. Apparatus for providing a measure of the gross weight of an engine powered aircraft comprising a. means responsive to an operating characteristic of each of the aircraft engines at the Mach number speed and static pressure environment of the aircraft for providing a signal corresponding to the thrust produced on the aircraft by each of the engines and means for summing all of said thrust signals for providing a resultant signal corresponding to the total thrust produced by all of the engines, b. means responsive to accelerations of the aircraft along mutually perpendicualr axes corresponding to the vertical and longitudinal axes of the aircraft and for providing signals corresponding thereto, c. means responsive to the Mach number speed of the aircraft and the static pressure environment of the aircraft for providing signals corresponding thereto, d. means responsive to the positions of aerodynamic surfaces of the aircraft affecting the lift and drag characteristics thereof, and e. computer means responsive to all of said signals for providing an output signal corresponding to the solution of the pair of equations $$W = (C_L \cos \alpha + C_D \sin \alpha)(.7 p_s M^2 S)\left(\frac{g}{a_z}\right)$$

-continued $$\frac{(C_L \sin \alpha - C_D \cos \alpha)}{(C_L \cos \alpha + C_D \sin \alpha)} = \left(\frac{a_X}{g} - \frac{T}{W}\right)\left(\frac{g}{a_z}\right)$$

wherein
- W = the gross weight of the aircraft
- T = the total thrust of the engines
- $a_x$ = longitudinal acceleration of the aircraft
- $a_z$ = normal acceleration of the aircraft
- M = the Mach number speed of the aircraft
- $P_S$ = the static air pressure at the aircraft
- $\alpha$ = the angle of attack of the aircraft
- $C_L$ = the coefficient of lift of the aircraft
- $C_D$ = the coefficient of drag of the aircraft
- S = the wing area of the aircraft
- g = the gravity acceleration of the earth, said output signal corresponding to the simultaneous solution of said equations for said gross weight term W.

23. Apparatus for providing a measure of the position of the center of gravity of an aircraft having a main sustaining wing, wing flags, horizontal stabilizer and elevator, relative to the mean aerodynamic chord of said wing comprising
 a. means for providing a signal proportional to the effective position of the horizontal stabilizer in producing a pitching movement on said aircraft,
 b. means for providing a signal proportional to a function of the horizontal and normal accelerations of the aircraft and the thrust-to-weight ratio of said aircraft, and
 c. means responsive to said signals for providing a signal proportional to the position of the center of gravity of the aircraft about which said pitching moment is effective.

24. The apparatus as set forth in claim 23 wherein the means for providing said horizontal stabilizer effective position signal includes
 a. means for providing a signal proportional to the position of said elevator,
 b. means for providing a signal proportional to the actual position of said horizontal stabilizer,
 c. means responsive to the Mach number speed of the aircraft for modifying said horizontal stabilizer position signal in accordance therewith,
 d. means for combining said elevator position signal and said modified horizontal stabilizer position signal for providing said horizontal stabilizer effective position signal.

25. The apparatus as set forth in claim 24 further including
 a. filter means having a relatively long time constant responsive to said center of gravity position signal for providing a signal proportional to average center of gravity position of said aircraft.

26. The apparatus as set forth in claim 25 further including
 a. means responsive to the difference between said center of gravity position signal and said average center of gravity position signal for providing a center of gravity error signal proportional to the essentially short term components of said center of gravity position signal, and
 b. means for feeding back said center of gravity error signal to said elevator signal and modified horizontal stabilizer signal combining means for compensating for the short term affects of said elevator on said horizontal stabilizer effective position signal.

27. The apparatus as set forth in claim 23 further including
 a. means responsive to the Mach number speed of said aircraft above a predetermined value thereof for further modifying said effective stabilizer position signal in accordance therewith, and
 b. means responsive to the position of said wing flaps below said predetermined value of Mach number speed for modifying said effective stabilizer position signal in accordance with said flap position signal.

28. The apparatus as set forth in claim 23 when said horizontal and normal acceleration and thrust-to-weight ratio function signal providing means comprises
 a. means providing signals proportional respectively to the horizontal and normal accelerations of said aircraft,
 b. means for providing a signal proportional to the thrust over weight ratio of said aircraft, and
 c. computer means responsive to said signals for providing a signal J proportional to the function thereof defined by the equation $$J = \left(\frac{a_x}{g} - \frac{T}{W}\right)\left(\frac{g}{a_z}\right).$$

* * * * *